(12) United States Patent
Shimaoka et al.

(10) Patent No.: US 10,550,305 B2
(45) Date of Patent: Feb. 4, 2020

(54) SUBTERRANEAN FORMATION PROCESSING COMPOSITION COMPRISING ULTRAFINE CELLULOSE FIBERS

(71) Applicant: Oji Holdings Corporation, Tokyo (JP)

(72) Inventors: Takayuki Shimaoka, Tokyo (JP); Yuichi Noguchi, Tokyo (JP); Ikue Homma, Tokyo (JP); Mitsuru Tsunoda, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 15/322,382

(22) PCT Filed: Jun. 29, 2015

(86) PCT No.: PCT/JP2015/068616
§ 371 (c)(1),
(2) Date: Dec. 27, 2016

(87) PCT Pub. No.: WO2016/002688
PCT Pub. Date: Jan. 7, 2016

(65) Prior Publication Data
US 2017/0226399 A1 Aug. 10, 2017

(30) Foreign Application Priority Data

Jun. 30, 2014 (JP) .................................. 2014-134078
Jun. 30, 2014 (JP) .................................. 2014-134079
Jun. 30, 2014 (JP) .................................. 2014-134080

(51) Int. Cl.
| | | |
|---|---|---|
| C09K 8/10 | (2006.01) | |
| E21B 21/00 | (2006.01) | |
| C09K 8/42 | (2006.01) | |
| C09K 8/72 | (2006.01) | |
| E21B 43/26 | (2006.01) | |
| C09K 8/40 | (2006.01) | |
| C09K 8/68 | (2006.01) | |
| C09K 8/90 | (2006.01) | |
| C09K 8/575 | (2006.01) | |
| E21B 33/14 | (2006.01) | |

(52) U.S. Cl.
CPC ............. C09K 8/10 (2013.01); C09K 8/42 (2013.01); C09K 8/424 (2013.01); C09K 8/725 (2013.01); E21B 21/00 (2013.01); E21B 43/26 (2013.01); C09K 8/40 (2013.01); C09K 8/5758 (2013.01); C09K 8/68 (2013.01); C09K 8/90 (2013.01); C09K 2208/08 (2013.01); E21B 33/14 (2013.01)

(58) Field of Classification Search
CPC ........ C09K 3/00; C09K 2208/08; C09K 8/10; C09K 8/40; C09K 8/514; C09K 8/5758; C09K 8/68; C09K 8/725; C09K 8/90; C09K 8/035; C09K 8/42; C09K 8/467; C09K 8/516; C09K 11/07; C09K 8/20; C09K 8/424; C09K 8/508; C09K 8/5751; C09K 8/60; C09K 8/70; C09K 8/88; C09K 8/92
See application file for complete search history.

(56) References Cited

U.S. PATENT DOCUMENTS

| | | |
|---|---|---|
| 5,703,225 A | 12/1997 | Shet et al. |
| 6,348,436 B1 | 2/2002 | Langlois et al. |
| 2003/0176293 A1 | 9/2003 | Schilling et al. |
| 2009/0291875 A1 | 11/2009 | Lant et al. |
| 2012/0328877 A1 | 12/2012 | Shiramizu et al. |
| 2013/0035263 A1 | 2/2013 | Laukkanen et al. |
| 2013/0196883 A1 | 8/2013 | Rincon-Torres et al. |
| 2013/0274149 A1 | 10/2013 | Lafitte et al. |

(Continued)

FOREIGN PATENT DOCUMENTS

| | | |
|---|---|---|
| JP | 6-206954 A | 7/1994 |
| JP | 2001-517251 A | 10/2001 |

(Continued)

OTHER PUBLICATIONS

International Preliminary Report on Patentability and Written Opinion of the International Searching Authority (Forms PCT/IB/338, PCT/ISA/237, PCT/IB/326 and PCT/IB/373) for International Application No. PCT/JP2015/068616, dated Jan. 12, 2017, with an English translation.
International Search Report and Written Opinion of the International Searching Authority (Forms PCT/ISA/220, PCT/ISA/210 and PCT/ISA/237) for International Application No. PCT/JP2015/068616, dated Oct. 6, 2015.

(Continued)

*Primary Examiner* — Kumar R Bhushan
(74) *Attorney, Agent, or Firm* — Birch, Stewart, Kolasch & Birch, LLP

(57) ABSTRACT

An object is to provide a dispersion of ultrafine cellulose fibers having a high thickening effect and a gelling function. There is provided a subterranean formation processing composition comprising ultrafine cellulose fibers, which has a haze value of 1.0% to 50%, when the composition is suspended in water such that the solid concentration of cellulose fibers is 0.2% by mass. The composition of the present invention can be used as an additive to the fluid at the time of the processing of subterranean formation, especially the processing of the well. The present invention provides also various fluids which are used in well processing. The present invention provides a method for processing a subterranean formation, for example, drilling of an exploratory well or a wildcat, an appraisal well, an exploratory well or an exploration well, a delineation well, a development well, a production well, an injection well, an observation well, and a service well; cementing; fracturing; and a method for producing petroleum resources.

11 Claims, 3 Drawing Sheets

(56) References Cited

U.S. PATENT DOCUMENTS

| | | | | |
|---|---|---|---|---|
| 2013/0338250 A1* | 12/2013 | Umemoto | ............. | D21H 11/20 |
| | | | | 522/18 |
| 2015/0368540 A1* | 12/2015 | Monclin | ................. | C09K 8/68 |
| | | | | 507/101 |

FOREIGN PATENT DOCUMENTS

| | | | |
|---|---|---|---|
| JP | 2010-37348 | A | 2/2010 |
| JP | 2010-254726 | A | 11/2010 |
| JP | 2011-162608 | A | 8/2011 |
| JP | 2011-185122 | A | 9/2011 |
| JP | 2013-136859 | A | 7/2013 |
| JP | 2013-185122 | A | 9/2013 |
| JP | 5296445 | B2 | 9/2013 |
| JP | 2015-508839 | A | 3/2015 |
| WO | WO 96/40599 | A1 | 12/1996 |
| WO | WO 2012/107642 | A1 | 8/2012 |
| WO | WO2012/115115 | * | 8/2012 |
| WO | WO 2013/073652 | A1 | 5/2013 |
| WO | WO 2013/121086 | A1 | 8/2013 |
| WO | WO 2013/176033 | A1 | 11/2013 |
| WO | WO 2013/176049 | A1 | 11/2013 |
| WO | WO 2014/024876 | A1 | 2/2014 |
| WO | WO 2015/029960 | A1 | 3/2015 |

OTHER PUBLICATIONS

Saito et al., "Homogeneous Suspensions of Individualized Microfibrils from TEMPO-Catalyzed Oxidation of Native Cellulose," Biomacromolecules, vol. 7, No. 6, Jun. 2006 (Published on Web May 3, 2006), pp. 1687-1691.

Van Den Berg et al., "Preparation of Homogeneous Dispersions of Tunicate Cellulose Whiskers in Organic Solvents," Biomacromolecules, vol. 8, No. 4, 2007 (Published on Web Mar. 8, 2007), pp. 1353-1357.

International Preliminary Report on Patentability and Written Opinion of the International Searching Authority (Forms PCT/IB/338, PCT/IB/373, PCT/ISA/237 and PCT/IB/326) for International Application No. PCT/JP2015/068617, dated Jan. 12, 2017, with an English translation.

International Search Report and Written Opinion of the International Searching Authority (Forms PCT/ISA/220, PCT/ISA/210 and PCT/ISA/237) for International Application No. PCT/JP2015/068617, dated Oct. 6, 2015.

Japanese Office Action dated Aug. 21, 2018, issued in corresponding Japanese Patent Application No. 2016-531348.

Office Action from co-pending U.S. Appl. No. 15/322,345 dated Jan. 18, 2019.

Office Action from co-pending U.S. Appl. No. 15/322,345 dated Jul. 20, 2018.

U.S. Office Action, dated Aug. 9, 2019, for U.S. Appl. No. 15/322,345.

U.S. Office Action, dated Dec. 6, 2019, for U.S. Appl. No. 15/322,345.

* cited by examiner

[Figure 1]
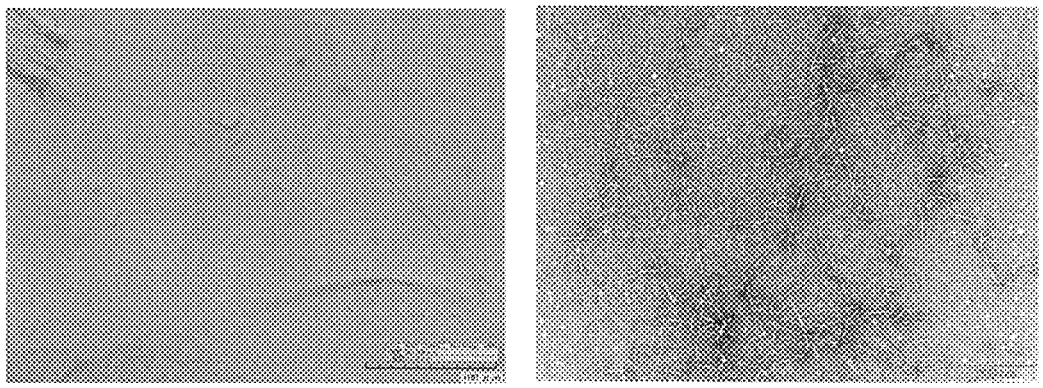
[Figure 2]
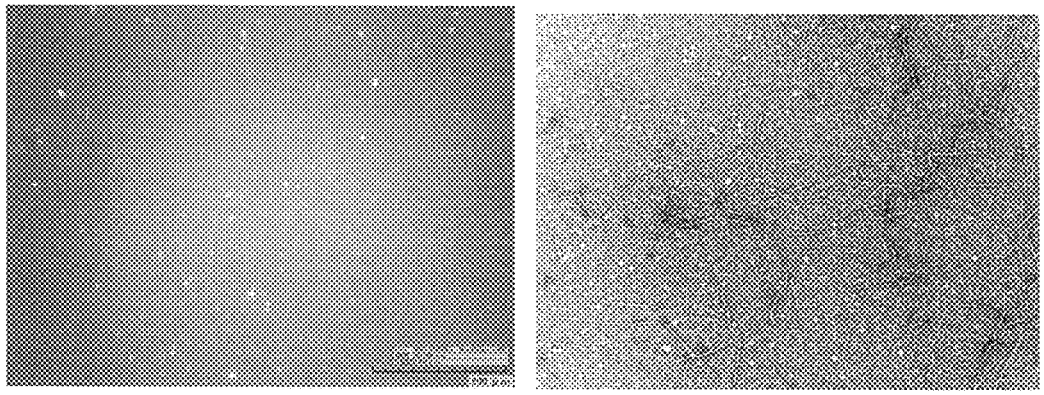

[Figure 3]
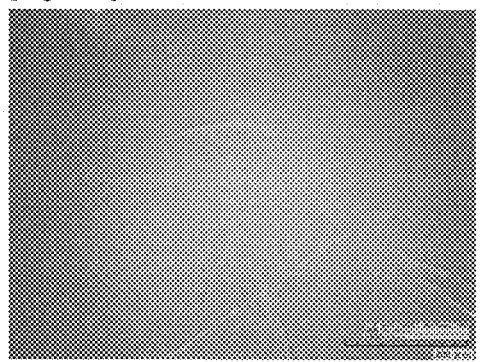
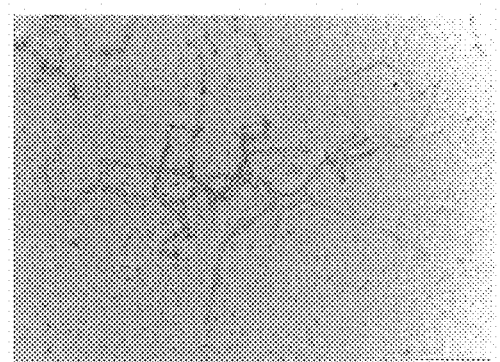
[Figure 4]
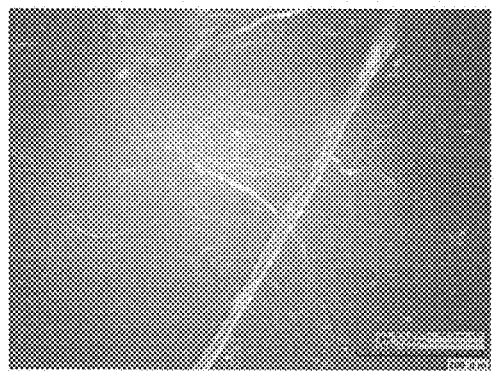
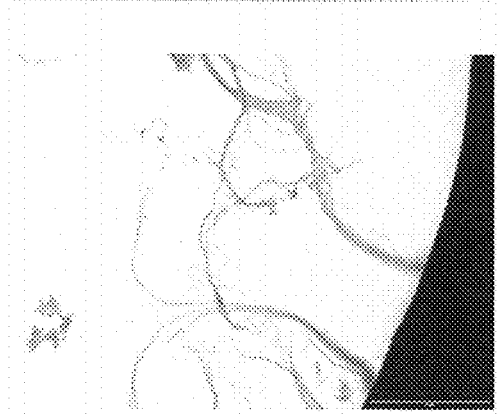

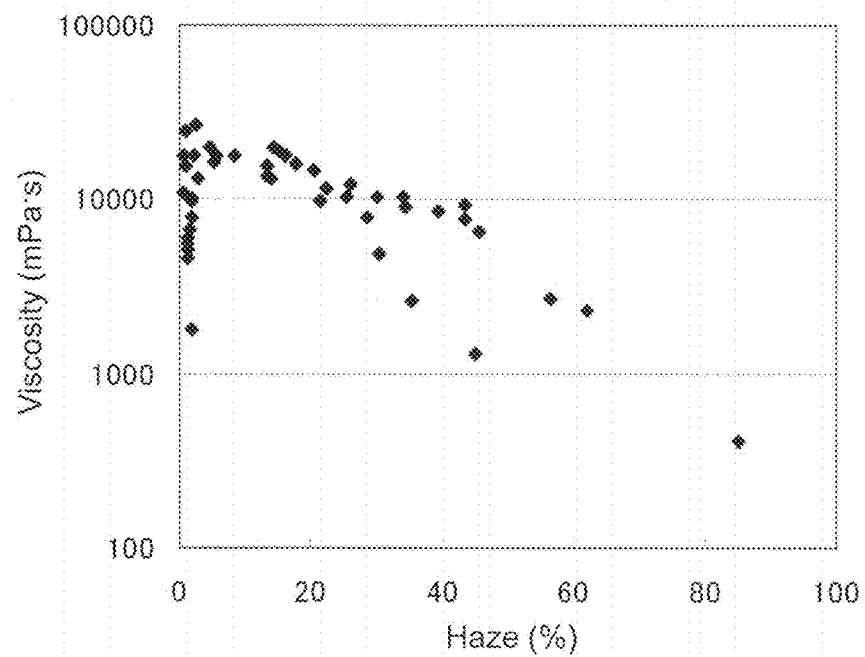

SUBTERRANEAN FORMATION PROCESSING COMPOSITION COMPRISING ULTRAFINE CELLULOSE FIBERS

TECHNICAL FIELD

The present invention relates to a subterranean formation processing composition comprising ultrafine cellulose fibers. The composition of the present invention is useful in the field of oil and gas mining, seismic prospecting, and excavation, investigation, testing, cementing, stimulation and the like of subterranean formations.

BACKGROUND ART

When a well is made to recover natural resources existing in a subterranean formation or area, such as gas, petroleum, and water, various fluids for processing subterranean formations are used. Examples of such a subterranean formation processing fluid include mud water used for excavation, a cementing fluid used for the reinforcement of a water well, and a fracturing fluid used for hydraulic fracturing. A thickener is used for a majority of these fluids.

Use of a thickener upon excavation imparts viscosity to mud water. By circulating such mud water, the scraped rock stone cuttings are transported from the bottom hole to the ground. At the time, by the action of a thickener, mud water has a thixotropic nature (a property in which mud water becomes highly viscous gel if it is left at rest, but the viscosity is decreased, as the velocity of a flowing fluid is increased), and thus, even if the operation is suspended, cuttings in the mud water are not immediately precipitated, but the cuttings can be transported to the ground. In addition, mud water forms a side wall and prevents the collapse of subterranean formations or the outflow of the mud water. Hence, mud water, which can form a thin mud wall and has a small amount of water dehydrated, is preferable. Depending on a subterranean formation and the depth thereof, and taking into consideration salt tolerance or heat resistance, the mixing of sewage water is adjusted.

Cementing fluid is mainly used for filling cement between a casing and a side wall to fix the casing, after a well has been made. If cementing is improperly carried out, since it is likely to lead to the abolition of a well, the leakage of gas, etc., a high-quality cementing fluid is used. As a thickener for such a cementing fluid, hydroxyethyl cellulose, polyvinyl alcohol and the like, which are insusceptible to metal ions, have been used.

Fracturing fluid is a liquid used for stimulating a gas or oil storing layer to promote generation of such gas or oil. For example, since gas or oil is present in a shale layer in a state in which it remains or adsorbs on rock stones, it causes poor flowing and thus it is hardly removed. Hence, the mining of shale gas or oil is generally carried out as follows. That is, first, a well is filled with a fracturing fluid, and a pressure is then applied to crush rock stones and make cracks. At that time, spherical sands each having a size of approximately 0.5 mm, called "proppants," which are dispersed in the fracturing fluid, are pushed into the cracks, and even after termination of such pressurization, the proppants serve as a supporting body, and are used such that the cracks are not closed. Subsequently, the fracturing fluid, the viscosity of which is decreased as a result of the decomposition of a thickener comprised in the fracturing fluid, is recovered to the ground. Thereby, the flow channel for gas or oil is ensured. Guar gum has been often used as a thickener for the fracturing fluid, since it is able to skillfully control an increase in the viscosity by crosslinking and a decrease in the viscosity by decomposition. Moreover, in order to enhance the dispersibility of proppants, polylactic acid fibers may be mixed into the fracturing fluid.

On the other hand, as components of thickeners for such an intended use, fine cellulose fibers (Patent Literature 1), and a composition for processing subterranean formations, which comprises cellulose nanocrystals produced by an acid hydrolysis method, have been proposed (Patent Literature 2, Patent Literature 3).

Furthermore, in recent years, an innovative method for producing nano-sized ultrafine cellulose fibers, while maintaining the crystallinity of cellulose, has been developed (Non Patent Literature 1). By this method, an aldehyde group or a carboxy group is introduced into the surface of cellulose fibers, and thereafter, fine cellulose fibers are generated by mechanical processing. The ultrafine cellulose fibers obtained by this method have high crystallinity, and also, fibers longer than cellulose nanocrystals can be obtained, and can be converted to high-viscosity gel in water. It has been proposed to use the ultrafine cellulose fibers produced by this method in thickeners for cosmetic products, or in thickeners for excavation (Patent Literatures 4 and 5). In general, it is considered that the thickening properties of a dispersion of ultrafine cellulose fibers can be increased by promoting the miniaturization of cellulose fibers to increase surface area, and also by increasing the contact of fibers with one another. As such, in order to increase the viscosity of a fluid used for excavation, it has been proposed to use ultrafine cellulose fibers having a fiber width of 100 nm or less (Patent Literature 4).

PRIOR ART LITERATURES

Patent Literatures

Patent Literature 1: U.S. Pat. No. 6,348,436
Patent Literature 2: US2013/0196883
Patent Literature 3: US2013/0274149
Patent Literature 4: JP Patent Publication (Kokai) No. 2010-37348 A (Japanese Patent No. 5296445)
Patent Literature 5: US2013/0035263

Non Patent Literature

Non Patent Literature 1: Saito T & al., Homogeneous suspensions of individualized microfibrils from TEMPO-catalyzed oxidation of native cellulose. Biomacromolecules 2006, 7 (6), 1687-91

SUMMARY OF INVENTION

Object to be Solved by the Invention

According to the studies of the present inventors, the ultrafine cellulose fibers obtained in Patent Literature 1 have extremely poor crystallinity and insufficient strength. Therefore, when these ultrafine cellulose fibers are used in excavation involving high shearing force, it is likely that the fibers are cut and the viscosity is thereby decreased. Moreover, it is also considered that these fibers do not have sufficient viscosity. In contrast, differing from the case of the ultrafine cellulose fibers, the cellulose nanocrystals disclosed in Patent Literatures 2 and 3 are produced by an acid hydrolysis method. The cellulose nanocrystals of Patent Literatures 2 and 3 have been problematic in that amorphous regions are destroyed by acid hydrolysis, fibers become extremely short, and thus, sufficient viscosity cannot be obtained.

On the other hand, ultrafine cellulose fibers having high dispersibility have high transparency. However, if coarse fibers remain, the appearance becomes a clouded dispersion. Hence, as for thickeners that are assumed to be used in cosmetic products required to have high transparency, such coarse fibers have been considered as impurities, and it has been proposes to remove coarse fibers, which have not been subjected to a reinforced defibration treatment or miniaturization by centrifugation. Further, as described above, it has been generally said that, in the case of a dispersion of ultrafine cellulose fibers, as the miniaturization of fibers progresses, the viscosity of the dispersion is increased. It has been important to sufficiently miniaturize fibers in a certain way and to decrease coarse fibers.

Means for Solving the Object

Under such circumstances, the present inventors have conducted intensive studies directed towards discovering a dispersion of ultrafine cellulose fibers having a high thickening effect and a gelling function. As a result, surprisingly, the inventors have found that an ultrafine cellulose fiber dispersion having an excellent thickening properties can be produced by controlling the degree of miniaturization and setting a haze value in a certain range, or by intentionally allowing a certain amount of coarse fibers to coexist with ultrafine fibers. In addition, in an experiment intended for use in excavation, it has been elucidated that such a dispersion is an additive extremely suitable for excavation use, such that it has a sufficient viscosity property and the coarse fibers comprised therein are able to enhance the stability of particles or water stopping property, thereby completing the present invention.

The present invention provides the following.
[1] A subterranean formation processing composition comprising ultrafine cellulose fibers, which has a haze value of 1.0% to 50%, when the composition is suspended in water such that the solid concentration of cellulose fibers is 0.2% by mass.
[2] The composition according to [1] above, which comprises coarse cellulose fibers and ultrafine cellulose fibers.
[3] The composition according to [1] or [2] above, wherein the coarse cellulose fibers have a fiber width of 1 μm or more, and the ultrafine cellulose fibers have a fiber width of 100 nm or less.
[4] The composition according to any one of [1] to [3] above, wherein the amount of the coarse cellulose fibers is 0.5% or more and less than 85%.
[5] The composition according to any one of [1] to [4] above, which is in the form of a dispersion or a solid.
[6] The composition according to any one of [1] to [5] above, wherein the cellulose fibers are chemically modified.
[7] The composition according to [6] above, wherein the cellulose fibers are anionized or cationized.
[8] The composition according to [7] above, wherein the cellulose fibers are carboxylated or phosphorylated.
[9] The composition according to [8] above, wherein the amount of substituents is 0.1 mmol/g or more and 3.0 mmol/g or less.
[10] The composition according to [1] to [9] above, wherein the cellulose fibers comprise 5% or more of amorphous regions.
[11] The composition according to any one of [1] to [10] above, which is used by being added to a fracturing fluid, mud water, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, or a gravel packing fluid.
[12] A subterranean formation processing fluid comprising the composition according to any one of [1] to [11] above, and any one selected from the group consisting of a weighting material, a viscosity adjuster, a dispersant, a coagulant, a lost circulation preventing agent, a pH control agent, a friction reducer, a hydration expansion control agent, an emulsifier, a surfactant, a biocide, an antifoaming agent, a scale inhibitor, a corrosion inhibitor, a temperature stabilizer, a resin coating agent, a crack supporting material, salts, and proppants.
[13] A subterranean formation processing fluid comprising the composition according to any one of [1] to [11] above, and a water-soluble polymer.
[14] A method for producing the composition according to any one of [1] to [11] above, which comprises a step of concentrating or drying a cellulose fiber dispersion, and then re-dispersing the obtained concentrate or dried product in an aqueous solvent to obtain a re-dispersion.
[15] The production method according to [14] above, wherein the concentration is carried out using a concentrating agent and/or a drying machine.

The present invention provides the following.
[1] A subterranean formation processing composition comprising ultrafine cellulose fibers, which has a haze value of 1.9% to 40%, when the composition is suspended in water such that the solid concentration of cellulose fibers is 0.2% by mass.
[2] The composition according to [1] above, wherein the haze value is 2.5% to 30%.
[3] The composition according to [2] above, wherein the haze value is 2.5% to 15%.
[4] The composition according to any one of [1] to [3] above, which has a viscosity of 4700 mPa·s or more, when the composition is suspended in water such that the solid concentration of cellulose fibers is 0.4% by mass.
[5] The composition according to [4] above, wherein the viscosity is 7000 mPa·s or more.
[6] The composition according to [5] above, wherein the viscosity is 12500 mPa·s or more.
[7] The composition according to any one of [1] to [6] above, which comprises coarse cellulose fibers and ultrafine cellulose fibers.
[8] The composition according to [7] above, wherein the coarse cellulose fibers have a fiber width of 1 μm or more, and the ultrafine cellulose fibers have a fiber width of 100 nm or less.
[9] The composition according to any one of [1] to [8] above, which is in the form of a dispersion or a solid.
[10] The composition according to any one of [1] to [9] above, wherein the cellulose fibers are chemically modified.
[11] The composition according to [10] above, wherein the cellulose fibers are anionized or cationized.
[12] The composition according to [11] above, wherein the cellulose fibers are carboxylated or phosphorylated.
[13] The composition according to any one of [1] to [12] above, which is used by being added to a fracturing fluid, mud water, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, or a gravel packing fluid.

[14] A subterranean formation processing fluid comprising the composition according to any one of [1] to [13] above, and any one selected from the group consisting of a weighting material, a viscosity adjuster, a dispersant, a coagulant, a lost circulation preventing agent, a pH control agent, a friction reducer, a hydration expansion control agent, an emulsifier, a surfactant, a biocide, an antifoaming agent, a scale inhibitor, a corrosion inhibitor, a temperature stabilizer, a resin coating agent, a crack supporting material, salts, and proppants.

[15] A subterranean formation processing fluid comprising the composition according to any one of [1] to [13] above, and a water-soluble polymer.

[16] The fluid according to [15] above, wherein the water-soluble polymer is derived from natural polysaccharide.

[17] The fluid according to any one of [14] to [16] above, which is a fracturing fluid, mud water, or a cementing fluid.

[18] A method for processing a subterranean formation, using the composition according to any one of [1] to [13] above, or the fluid according to any one of [14] to [17] above.

[19] A method for producing petroleum resources, using the composition according to any one of [1] to [13] above, or the fluid according to any one of [14] to [17] above.

[20] A method for producing the composition according to any one of [1] to [13] above, which comprises a step of concentrating or drying a dispersion of cellulose fibers, and then re-dispersing the obtained concentrate or dried product in an aqueous solvent to obtain a re-dispersion.

[21] The production method according to [20] above, wherein the concentration is carried out using a concentrating agent and/or a drying machine.

The present invention also provides the following.

[1] A subterranean formation processing composition comprising coarse cellulose fibers and ultrafine cellulose fibers.

[2] The composition according to [1] above, wherein the amount of the coarse cellulose fibers is 0.5% or more and less than 85%.

[3] The composition according to [2] above, wherein the amount of the coarse cellulose fibers is 1.0% or more and less than 85%.

[4] The composition according to [3] above, wherein the amount of the coarse cellulose fibers is 1.5% or more and less than 85%.

[5] The composition according to any one of [1] to [4] above, which has a haze value of 1.9% to 40%, when the composition is suspended in water such that the solid concentration of cellulose fibers is 0.2% by mass.

[6] The composition according to [5] above, wherein the haze value is 2.5% to 30%.

[7] The composition according to [6] above, wherein the haze value is 2.5% to 15%.

[8] The composition according to any one of [1] to [7] above, which has a viscosity of 4700 mPa·s or more, when the composition is suspended in water such that the solid concentration of cellulose fibers is 0.4% by mass.

[9] The composition according to [8] above, wherein the viscosity is 7000 mPa·s or more.

[10] The composition according to [9] above, wherein the viscosity is 12500 mPa·s or more.

[11] The composition according to any one of [1] to [10] above, wherein the coarse cellulose fibers have a fiber width of 1 μm or more, and the ultrafine cellulose fibers have a fiber width of 100 nm or less.

[12] The composition according to any one of [1] to [11] above, which is in the form of a dispersion or a solid.

[13] The composition according to any one of [1] to [12] above, wherein the cellulose fibers are chemically modified.

[14] The composition according to [13] above, wherein the cellulose fibers are anionized or cationized.

[15] The composition according to [14] above, wherein the cellulose fibers are carboxylated or phosphorylated.

[16] The composition according to any one of [1] to [15] above, which is used by being added to a fracturing fluid, mud water, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, or a gravel packing fluid.

[17] A subterranean formation processing fluid comprising the composition according to any one of [1] to [16] above, and any one selected from the group consisting of a weighting material, a viscosity adjuster, a dispersant, a coagulant, a lost circulation preventing agent, a pH control agent, a friction reducer, a hydration expansion control agent, an emulsifier, a surfactant, a biocide, an antifoaming agent, a scale inhibitor, a corrosion inhibitor, a temperature stabilizer, a resin coating agent, a crack supporting material, salts, and proppants.

[18] A subterranean formation processing fluid comprising the composition according to any one of [1] to [16] above, and a water-soluble polymer.

[19] The fluid according to [18] above, wherein the water-soluble polymer is derived from natural polysaccharide.

[20] The fluid according to any one of [17] to [19] above, which is a fracturing fluid, mud water, or a cementing fluid.

[21] A method for processing a subterranean formation, using the composition according to any one of [1] to [16] above, or the fluid according to any one of [17] to [20] above.

[22] A method for producing petroleum resources, using the composition according to any one of [1] to [16] above, or the fluid according to any one of [17] to [20] above.

[23] A method for producing a composition comprising coarse cellulose fibers and ultrafine cellulose fibers, wherein the method comprises subjecting the coarse cellulose fibers having a fiber width of 1 μm or more to a miniaturization treatment to miniaturize some fibers, so as to obtain a composition comprising coarse cellulose fibers and ultrafine cellulose fibers having a fiber width of 100 nm or less.

[24] A method for producing the composition according to any one of [1] to [16] above, which comprises a step of concentrating or drying a dispersion of cellulose fibers, and then re-dispersing the obtained concentrate or dried product in an aqueous solvent to obtain a re-dispersion.

[25] The production method according to claim 25, wherein the concentration is carried out using a concentrating agent and/or a drying machine.

The present invention further provides the following.

[1] A subterranean formation processing composition comprising ultrafine cellulose fibers, which has a viscosity of 4700 mPa·s or more, when the composition is suspended in water such that the solid concentration of cellulose fibers is 0.4% by mass.

[2] The composition according to [1] above, wherein the viscosity is 7000 mPa·s or more.

[3] The composition according to [2] above, wherein the viscosity is 12500 mPa·s or more.

[4] The composition according to any one of [1] to [3] above, which has a haze value of 1.9% to 40%, when the composition is suspended in water such that the solid concentration of cellulose fibers is 0.2% by mass.

[5] The composition according to [4] above, wherein the haze value is 2.5% to 30%.

[6] The composition according to [5] above, wherein the haze value is 2.5% to 15%.

[7] The composition according to any one of [1] to [6] above, which comprises coarse cellulose fibers and ultrafine cellulose fibers.

[8] The composition according to [7] above, wherein the coarse cellulose fibers have a fiber width of 1 μm or more, and the ultrafine cellulose fibers have a fiber width of 100 nm or less.

[9] The composition according to any one of [1] to [8] above, which is in the form of a dispersion or a solid.

[10] The composition according to any one of [1] to [9] above, wherein the cellulose fibers are chemically modified.

[11] The composition according to [10] above, wherein the cellulose fibers are anionized or cationized.

[12] The composition according to [11] above, wherein the cellulose fibers are carboxylated or phosphorylated.

[13] The composition according to any one of [1] to [12] above, which is used by being added to a fracturing fluid, mud water, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, or a gravel packing fluid.

[14] A subterranean formation processing fluid comprising the composition according to any one of [1] to [13] above, and any one selected from the group consisting of a weighting material, a viscosity adjuster, a dispersant, a coagulant, a lost circulation preventing agent, a pH control agent, a friction reducer, a hydration expansion control agent, an emulsifier, a surfactant, a biocide, an antifoaming agent, a scale inhibitor, a corrosion inhibitor, a temperature stabilizer, a resin coating agent, a crack supporting material, salts, and proppants.

[15] A subterranean formation processing fluid comprising the composition according to any one of [1] to [13] above, and a water-soluble polymer.

[16] The fluid according to [15] above, wherein the water-soluble polymer is derived from natural polysaccharide.

[17] The fluid according to any one of [14] to [16] above, which is a fracturing fluid, mud water, or a cementing fluid.

[18] A method for processing a subterranean formation, using the composition according to any one of [1] to [13] above, or the fluid according to any one of [14] to [17] above.

[19] A method for producing petroleum resources, using the composition according to any one of [1] to [13] above, or the fluid according to any one of [14] to [17] above.

[20] A method for producing the composition according to any one of [1] to [13] above, which comprises a step of concentrating or drying a dispersion of cellulose fibers, and then re-dispersing the obtained concentrate or dried product in an aqueous solvent to obtain a re-dispersion.

[21] The production method according to [20] above, wherein the concentration is carried out using a concentrating agent and/or a drying machine.

Advantageous Effects of Invention

According to the present invention, a high viscosity can be imparted to a fluid. In addition, characteristics suitable for the processing of subterranean formations can be imparted to a fluid.

BRIEF DESCRIPTION OF DRAWINGS

FIG. 1 shows a transmission electron microscopic observation photograph (right) and a microscopic observation photograph (left) of cellulose suspension 2 obtained in Production Example 2.

FIG. 2 shows a transmission electron microscopic observation photograph (right) and a microscopic observation photograph (left) of cellulose suspension 11 obtained in Production Example 11.

FIG. 3 shows a transmission electron microscopic observation photograph (right) and a microscopic observation photograph (left) of cellulose suspension 12 obtained in Production Example 12.

FIG. 4 shows a transmission electron microscopic observation photograph (right) and a microscopic observation photograph (left) of cellulose suspension 16 obtained in Production Example 16.

FIG. 5 is a graph prepared by plotting cellulose suspensions 1 to 47, using the horizontal axis as a haze and using the longitudinal axis as a viscosity.

FIG. 6 is a graph prepared by plotting cellulose suspensions 1 to 47, using the horizontal axis as the amount of coarse fibers and using the longitudinal axis as a viscosity.

EMBODIMENTS FOR CARRYING OUT THE INVENTION

Hereinafter, the present invention will be described in more detail. Materials, methods, and numeric ranges, etc., described in the present specification, are given for illustrating embodiments of the present invention and are not intended to limit the scope of the invention. Furthermore, use of the other materials, methods, and numeric values, etc., is not excluded.

The range "X to Y" includes both of the values X and Y. The term "%" represents a percentage based on mass unless otherwise specified.

[Coarse/Ultrafine Cellulose Fibers]

The term "cellulose fibers" is used in the present invention to include both coarse cellulose fibers and ultrafine cellulose fibers, unless otherwise specified.

The average fiber width of coarse cellulose fibers (which may also be simply referred to as "coarse fibers") is not particularly limited in the present invention. It is, for example, 1 μm or more, preferably 5 μm or more, and even more preferably 10 μm or more. A method of measuring the fiber width of cellulose fibers will be described later.

The average fiber width of ultrafine cellulose fibers (which may also be simply referred to as "ultrafine fibers") is not particularly limited in the present invention. It is, for example, less than 1000 nm, preferably 100 nm or less, more preferably 50 nm or less, and even more preferably 10 nm or less. Such ultrafine cellulose fibers may be either cellulose fibers that are much thinner than pulp fibers generally used for paper manufacturing, or rod-like particles. In both cases, the average fiber width of ultrafine cellulose fibers is preferably 2 nm or more. If the average fiber width of ultrafine cellulose fibers is less than 2 nm, since the ultrafine cellulose fibers are dissolved in water in the form of cellulose molecules, the physical properties (strength, rigidity, and dimensional stability) of the ultrafine cellulose fibers cannot be expressed.

<Average Fiber Width of Cellulose Fibers>

The average fiber width of cellulose fibers can be measured and/or calculated as follows. An aqueous suspension containing the cellulose fibers having a concentration of 0.05 to 0.1% by mass is prepared, and the suspension is casted onto a hydrophilized carbon film-coated grid to prepare a sample for TEM observation. If the sample contains wide fibers, SEM images of the surface of the suspension casted onto glass may be observed. The sample is observed using electron microscope images taken at a magnification of 1000×, 5000×, 10000×, or 50000× according to the widths of the constituent fibers. However, the sample, the observation conditions, and the magnification are adjusted so as to satisfy the following conditions:

(1) one straight line X is drawn at an arbitrary site in an observation image, and 20 or more fibers intersect the straight line X; and (2) a straight line Y vertically intersecting the straight line in the same image is drawn, and 20 or more fibers intersect the straight line Y.

The widths of the fibers interlocking the straight line X and the straight line Y are visually read for observation images that satisfy the conditions described above. In this way, 3 or more images of at least surface portions that do not overlap with each other are observed, and the widths of the fibers interlocking the straight line X and the straight line Y is read for each of the images. In this way, the fiber widths of at least 20 fibers×2×3=120 fibers are read. The average fiber width (also simply referred to as the "fiber width") of the cellulose fibers is the average value of the fiber widths thus read.

It is to be noted that the fiber length of cellulose fibers is not particularly limited.

<Raw Materials for Cellulose Fibers>

In the present invention, cellulose fibers, which are obtained by subjecting a raw material of cellulose to a chemical treatment or a defibration treatment, can be used. Examples of such a cellulose raw material include, but are not particularly limited, paper pulp, cotton-based pulp such as cotton linter or cotton lint, non-wood-based pulp such as hemp, straw or bagasse, and cellulose isolated from sea squirts, seaweed, etc. Among these, paper pulp is preferable in terms of availability, but it is not particularly limited. Examples of such paper pulp include, but are not particularly limited to, broad-leaved tree bleached kraft pulp (hardwood bleached kraft pulp (LBKP), hardwood unbleached kraft pulp (LUKP), hardwood oxygen bleached kraft pulp (LOKP), etc.), needle-leaved tree bleached kraft pulp (softwood bleached kraft pulp (NBKP), softwood unbleached kraft pulp (NUKP), softwood oxygen bleached kraft pulp (NOKP), etc.), chemical pulp such as sulfite pulp (SP) or soda pulp (AP), semi-chemical pulp such as semichemical pulp (SCP) or chemiground wood pulp (CGP), mechanical pulp such as ground pulp (GP) or thermomechanical pulp (TMP, BCTMP), non-wood pulp such as paper mulberry, mitsumata, hemp or kenaf, and deinked pulp in which waste paper is used as a raw material. Among these, in terms of availability, kraft pulp, deinked pulp, and sulfite pulp are preferable, but the examples are not particularly limited thereto. Such cellulose raw materials may be used as a single type alone, or may be used by mixing two or more thereof.

Cellulose fibers are composed of an aggregate of cellulose molecules comprising a crystal portion, and in the present invention, such a crystal structure is preferably a type I crystal structure (parallel strand). Whether cellulose fibers have a type I crystal structure can be identified using a diffraction profile obtained from a wide-angle X-ray diffraction image, in which CuKα ($\lambda$=1.5418 Å) monochromated with graphite is used. Specifically, cellulose fibers having a type I crystal structure can be identified based on the fact that they have typical peaks in two positions, namely, around 2θ=14 to 17° and around 2θ=22 to 23°.

In a preferred embodiment, the ratio of the type I crystal structure in cellulose fibers is preferably 30% or more, more preferably 50% or more, and even more preferably 70% or more. However, differing from the cellulose nanocrystals described in Patent Literature 2 and Patent Literature 3, which are produced by destroying amorphous regions, the cellulose fibers of the present invention also have amorphous regions.

In a preferred embodiment, cellulose fibers have 5% or more of amorphous regions. The percentage of amorphous regions comprised in cellulose fibers is preferably 10% or more, and more preferably 20% or more.

The proportion of the type I crystal structure in the cellulose fibers is also referred to as a cellulose type I crystallization index (%) which can be calculated on the basis of a measurement value in an X-ray diffraction apparatus according to the following expression (1):

[Expression 1]

$$\text{Cellulose type } I \text{ crystallization index } (\%) = [(I_{22.6} - I_{18.5})/I_{22.6}] \times 100 \quad (1)$$

In the expression, $I_{22.6}$ represents the diffraction intensity of a lattice plane (002 plane) (diffraction angle 2θ=22.6°) in X-ray diffraction, and $I_{18.5}$ represents the diffraction intensity of an amorphous moiety (diffraction angle 2θ=18.5°).

<Chemical Treatment>

The cellulose fibers used in the present invention are preferably subjected to a chemical treatment and is chemically modified. Cellulose fibers, on the surface of which a functional group has been introduced as a result of chemical modification, have an improved dispersibility in water, and the efficiency can be enhanced in the subsequent defibration treatment step. The chemical treatment method is not particularly limited, as long as it is a method capable of obtaining ultrafine fibers. Examples of the chemical treatment method include an acid treatment, an ozone treatment, a TEMPO oxidation treatment, an enzyme treatment, and a treatment of using a compound capable of forming a covalent bond with cellulose or a functional group in a fibrous raw material.

One example of the acid treatment can include, but are not particularly limited to, a method described in Otto van den Berg; Jeffrey R. Capadona; Christoph Weder; Biomacromolecules 2007, 8, 1353-1357. Specifically, the cellulose fibers are subjected to hydrolysis treatment with sulfuric acid, hydrochloric acid, or the like.

One example of the ozone treatment can include, but are not particularly limited to, a method described in JP Patent Publication (Kokai) No. 2010-254726 A (2010). Specifically, the fibers are subjected to the ozone treatment and then dispersed in water, followed by the crushing treatment of the obtained aqueous dispersion of the fibers.

One example of the TEMPO oxidation can include, but are not particularly limited to, a method described in Saito T & al. Homogeneous suspensions of individualized microfibrils from TEMPO-catalyzed oxidation of native cellulose. Biomacromolecules 2006, 7 (6), 1687-91. Specifically, the fibers are subjected to the TEMPO oxidation treatment and then dispersed in water, followed by the crushing treatment of the obtained aqueous dispersion of the fibers.

One example of the enzyme treatment can include, but are not particularly limited to, a method described in Japanese Patent Application No. 2012-115411 (the contents described in Japanese Patent Application No. 2012-115411 are incorporated herein by reference in its entirety). Specifically, this method involves treating the fiber raw material with an enzyme at least under a condition where the ratio between the EG activity and the CBHI activity of the enzyme is 0.06 or more.

The EG activity is measured and defined as described below.

A substrate solution (concentration: 100 mM, containing an acetic acid-sodium acetate buffer solution of pH 5.0) of carboxymethylcellulose having a concentration of 1% (W/V) (CMCNa High viscosity; Cat No. 150561, MP Biomedicals, Inc.) is prepared. An enzyme for assay is diluted (any dilution ratio at which the absorbance of an enzyme solution given below can apply to a calibration curve obtained from glucose standard solutions given below) with a buffer solution (same as above) in advance. To 90 µl of the substrate solution, 10 µl of the enzyme solution obtained by the dilution is added and reacted therewith at 37° C. for 30 minutes.

In order to prepare a calibration curve, ion-exchange water (blank) and glucose standard solutions (concentration: at least 4 standard solutions differing in concentration from 0.5 to 5.6 mM) are selected, and 100 µl each thereof is prepared and incubated at 37° C. for 30 minutes.

After the reaction, 300 µl of a DNS coloring solution (1.6% by mass of NaOH, 1% by mass of 3,5-dinitrosalicylic acid, and 30% by mass of potassium sodium tartrate) is added to each of the enzyme-containing solution, the blank for a calibration curve, and the glucose standard solutions, and the mixture is boiled for 5 minutes to develop color. Immediately after the color development, the reaction solution is cooled in ice, and 2 ml of ion-exchange water is added thereto, followed by well mixing. The mixture is left standing for 30 minutes, and the absorbance is measured within 1 hour thereafter.

For the absorbance measurement, 200 µl of the reaction solution is added to each well of a 96-well microwell plate (e.g., 269620, manufactured by Nalge Nunc International), and the absorbance at 540 nm can be measured using a microplate reader (e.g., Infinite M200, manufactured by Tecan Trading AG).

A calibration curve is prepared using the absorbance of each glucose standard solution from which the absorbance of the blank has been subtracted, and the glucose concentration. The amount of reducing sugar formed corresponding to glucose in the enzyme solution is calculated by subtracting the absorbance of the blank from the absorbance of the enzyme solution and then using the calibration curve (when the absorbance of the enzyme solution does not apply to the calibration curve, the dilution ratio for diluting the enzyme with the buffer solution as described above is changed, followed by re-measurement). The amount of the enzyme that forms 1 µmole of glucose-equivalent reducing sugar for 1 minute is defined as 1 unit. The EG activity can be determined according to the following expression:

$$EG \text{ activity=Amount of reducing sugar formed corresponding to glucose (µmole) in 1 ml of the enzyme solution obtained by dilution with the buffer solution/30 min×Dilution ratio}$$

[see Sakuzo Fukui, "Experimental Methods of Biochemistry (Quantitative Determination of Reducing Sugar) 2nd edition", Gakkai Shuppan Center Co., Ltd., p. 23 to 24 (1990)].

The CBHI activity is measured and defined as described below.

32 µl of 1.25 mM 4-methylumbelliferyl-cellobioside (concentration: 125 mM, dissolved in an acetate-sodium acetate buffer solution of pH 5.0) is added to each well of a 96-well microwell plate (e.g., 269620, manufactured by Nalge Nunc International). 4 µl of 100 mM glucono-1,5-lactone is added to each well. Further, 4 µl of a solution containing an enzyme for assay diluted (any dilution ratio at which the fluorescence intensity of an enzyme solution given below can apply to a calibration curve obtained from standard solutions given below) with the same buffer solution as above is added to each well and reacted therewith at 37° C. for 30 minutes. Then, the reaction is terminated by the addition of a 500 mM glycine-NaOH buffer solution (pH 10.5) at 200 µl/well.

40 µl each of 4-methyl-umbelliferon standard solutions (concentration: at least 4 standard solutions differing in concentration from 0 to 50 µM) is added as a standard solution for a calibration curve to each well of the same 96-well microwell plate as above and warmed at 37° C. for 30 minutes. Then, 200 µl of a 500 mM glycine-NaOH buffer solution (pH 10.5) is added to each well.

The fluorescence intensity at 350 nm (excitation light: 460 nm) is measured using a microplate reader (e.g., Fluoroskan Ascent FL, manufactured by Thermo Labsystems Inc.). The amount of 4-methyl-umbelliferon formed in the enzyme solution is calculated using the calibration curve prepared from the data on the standard solutions (when the fluorescence intensity of the enzyme solution does not apply to the calibration curve, the dilution ratio is changed, followed by re-measurement). The amount of the enzyme that forms 1 µmole of 4-methyl-umbelliferon for 1 minute is defined as 1 unit. The CBHI activity can be determined according to the following expression:

$$CBHI \text{ activity=Amount of 4-methyl-umbelliferon formed (µmole) in 1 ml of the diluted enzyme solution/30 min×Dilution ratio.}$$

Examples of the treatment with a compound capable of forming a covalent bond with a functional group in the cellulose or fiber raw material can include, but are not particularly limited to, the following methods:

treatment with a compound having a quaternary ammonium group described in JP Patent Publication (Kokai) No. 2011-162608 A (2011);

a method using a carboxylic acid compound described in JP Patent Publication (Kokai) No. 2013-136859 A (2013);

a method using "at least one compound selected from an oxo acid and polyoxo acid containing a phosphorus atom in their structures, and salts thereof" described in International Publication No. WO2013/073652 (PCT/JP2012/079743); and a method using carboxymethylation reaction described in JP Patent Publication (Kokai) No. 2013-185122 A (2013).

The treatment with a compound having a quaternary ammonium group described in JP Patent Publication (Kokai) No. 2011-162608 A (2011) is a method of reacting hydroxy groups in fibers with a cationizing agent having a quaternary ammonium group to cationically modify the fibers.

The method described in JP Patent Publication (Kokai) No. 2013-136859 A (2013) employs at least one carboxylic acid compound selected from the group consisting of a compound having two or more carboxy groups, an acid anhydride of the compound having two or more carboxy groups, and their derivatives. This method comprises a carboxy group introduction step of introducing the carboxy groups into a fiber raw material by the treatment of the fiber raw material with the selected compound, and an alkali treatment step of treating the carboxy group-introduced fiber raw material with an alkali solution after the completion of the carboxy group introduction step.

International Publication No. WO2013/073652 (PCT/JP2012/079743) describes a method comprising treating a fiber raw material with at least one compound selected from oxo acid and polyoxo acid containing a phosphorus atom in their structures, and salts thereof (compound A). Specific examples thereof include a method of mixing the fiber raw material with a powder or an aqueous solution of compound A, and a method of adding an aqueous solution of compound A to slurry of the fiber raw material. Examples of the compound A include, but are not particularly limited to, phosphoric acid, polyphosphoric acid, phosphorous acid, phosphonic acid, polyphosphonic acid, and their esters. The compound A may be in the form of a salt. Examples of the compound having a phosphoric acid group include, but are not particularly limited to: phosphoric acid; sodium dihydrogen phosphate, disodium hydrogen phosphate, trisodium phosphate, sodium pyrophosphate, and sodium metaphosphate, which are sodium salts of phosphoric acid; potassium dihydrogen phosphate, dipotassium hydrogen phosphate, tripotassium phosphate, potassium pyrophosphate, and potassium metaphosphate, which are potassium salts of phosphoric acid; and ammonium dihydrogen phosphate, diammonium hydrogen phosphate, triammonium phosphate, ammonium pyrophosphate, and ammonium metaphosphate, which are ammonium salts of phosphoric acid.

JP Patent Publication (Kokai) No. 2011-185122 A (2011) describes a method for producing cellulose nanofibers, comprising treating, in a high-pressure homogenizer, anionically modified cellulose in which the degree of substitution by carboxymethyl is 0.02 to 0.50 per glucose unit. In this context, the anionic modification can be carried out, for example, by mercerization treatment using cellulose as a raw material and alkali metal hydroxide as a mercerizing agent at 0.5 to 20 times the mol of the glucose residues in the raw material, and subsequent etherification reaction using a carboxymethylating agent added at 0.05 to 10.0 times the mol of the glucose residues.

The cellulose fibers used in the present invention can be chemically modified. Such chemical modification is not particularly limited, and cationization or anionization is preferable.

When the cellulose fibers used in the present invention are cationized, the amount of cationic groups introduced is not particularly limited. The amount of cationic groups introduced per gram (mass) of ultrafine cellulose fibers is 0.1 to 3.0 mmol/g, preferably 0.10 to 2.5 mmol/g, more preferably 0.14 to 2.5 mmol/g, even more preferably 0.15 to 2.0 mmol/g, further preferably 0.2 to 2.0 mmol/g, and particularly preferably 0.6 to 2.0 mmol/g. When the cationic groups are introduced in such an amount, even if the cellulose fibers are added to alkaline mud water with a high salt concentration, agglutination can be suppressed, and a dispersed state can be retained. It is to be noted that the amount of cationic group introduced can be quantified by measuring the amount of nitrogen contained in cellulose fibers using a trace-amount nitrogen analyzer (e.g., TN-110, manufactured by Dia Instruments). In this case, the amount of cationic group substance (mmol/g) per unit mass can be obtained by dividing the content (g) of nitrogen in 1 g of ultrafine cellulose fibers containing cationic groups by the number and atomic amount of nitrogen atoms contained in the cationic groups.

The cellulose fibers used in the present invention are more preferably anionized (carboxylated, phosphorylated, or the like), and are further preferably phosphorylated.

When the cellulose fibers used in the present invention are anionized, the amount of anionic groups introduced is not particularly limited. The amount of anionic groups introduced per gram (mass) of ultrafine cellulose fibers is 0.1 to 3.0 mmol/g, preferably 0.10 to 2.5 mmol/g, more preferably 0.14 to 2.5 mmol/g, even more preferably 0.15 to 2.0 mmol/g, further preferably 0.2 to 2.0 mmol/g, and particularly preferably 0.6 to 2.0 mmol/g. If the amount of anionic groups introduced is less than 0.1 mmol/g, it is difficult to miniaturize the fibrous raw material, and ultrafine cellulose fibers have poor stability. On the other hand, if the amount of anionic groups introduced exceeds 3.0 mmol/g, sufficient viscosity cannot be obtained.

When the cellulose fibers used in the present invention are phosphorylated, the amount of phosphoric acid groups introduced is not particularly limited. The amount of phosphoric acid groups introduced per gram (mass) of ultrafine cellulose fibers is 0.1 to 3.0 mmol/g, preferably 0.10 to 2.5 mmol/g, more preferably 0.14 to 2.5 mmol/g, even more preferably 0.15 to 2.0 mmol/g, further preferably 0.2 to 2.0 mmol/g, and particularly preferably 0.6 to 2.0 mmol/g. If the amount of phosphoric acid groups introduced is less than 0.1 mmol/g, it is difficult to miniaturize the fibrous raw material, and ultrafine cellulose fibers have poor stability. On the other hand, the amount of phosphoric acid groups introduced exceeds 3.0 mmol/g, sufficient viscosity cannot be obtained.

When the cellulose fibers used in the present invention are carboxylated, the amount of carboxyl groups introduced is 0.1 to 3.0 mmol/g, preferably 0.10 to 2.5 mmol/g, more preferably 0.14 to 2.5 mmol/g, even more preferably 0.15 to 2.0 mmol/g, further preferably 0.2 to 2.0 mmol/g, and particularly preferably 0.6 to 2.0 mmol/g. If the amount of carboxyl groups introduced is less than 0.1 mmol/g, it is difficult to miniaturize the fibrous raw material, and ultrafine cellulose fibers have poor stability. On the other hand, the amount of carboxyl groups exceeds 3.0 mmol/g, sufficient viscosity cannot be obtained.

<Defibration Treatment/Miniaturization Treatment Step>

In order to obtain ultrafine cellulose fibers as one ingredient of the subterranean formation processing composition of the present invention, such ultrafine cellulose fibers can be obtained by subjecting cellulose fibers that have been chemically treated to a defibration treatment, as desired. In such a defibration treatment, in general, using a defibration treatment apparatus, a defibration treatment is performed on fibers, so as to obtain slurry containing ultrafine fibers. The treatment apparatus and the treatment method can be selected and/or designed, as appropriate, by a person skilled in the art.

Examples of the defibration treatment apparatus that can be used herein include a high-speed defibrating machine, a grinder (a stone mortar type pulverizer), a high-pressure homogenizer, an ultra-high-pressure homogenizer, a high pressure collision type pulverizer, a ball mill, and a bead mill. Moreover, other examples of the defibration treatment apparatus that can be used herein include a disc-type refiner, a conical refiner, a twin-screw kneader, a vibration mill, a homomixer under a high speed rotation, an ultrasonic dispersing machine, and a wet milling apparatus such as a beater. Examples of the defibration treatment apparatus are not limited thereto. Examples of a preferred defibration treatment method include, but are not particularly limited to, a high-speed defibrating machine, a high-pressure homogenizer, and an ultra-high-pressure homogenizer, which are hardly influenced by crushing media, and cause a few problems regarding contamination.

For the defibration treatment, the fiber raw material is preferably diluted into slurry using water and an organic solvent each alone or in combination, though the method is not particularly limited thereto. Water as well as a polar organic solvent can be used as a dispersion medium. Preferred examples of the polar organic solvent include, but are not particularly limited to, alcohols, ketones, ethers, dimethyl sulfoxide (DMSO), dimethylformamide (DMF), and dimethylacetamide (DMAc). Examples of the alcohols include methanol, ethanol, n-propanol, isopropanol, n-butanol, and t-butyl alcohol. Examples of the ketones include acetone and methyl ethyl ketone (MEK). Examples of the ethers include diethyl ether and tetrahydrofuran (THF). One of these dispersion media may be used, or two or more thereof may be used. The dispersion medium may also contain a solid content other than the fiber raw material, for example, urea having hydrogen-binding property.

As a result of such defibration treatment/miniaturization treatment, at least some cellulose fibers are miniaturized, and are used as one ingredient contributing to thickening in the present invention.

<Method for Producing Composition>

The method for producing the subterranean formation processing composition of the present invention having a controlled haze value or viscosity value is not particularly limited, as long as the produced composition exhibits the desired thickening effect, water-stopping effect, dispersibility-improving effect, etc. The composition of the present invention can be produced, for example, by mixing ultrafine fibers obtained by the aforementioned defibration treatment/miniaturization treatment, with coarse fibers obtained by another appropriate method.

Upon the production of the composition of the present invention, a step of miniaturizing coarse cellulose fibers is carried out. In this step, some coarse cellulose fibers are miniaturized, but not all coarse cellulose fibers are miniaturized, so that the present composition comprises both coarse cellulose fibers and ultrafine cellulose fibers, or so that the haze value or the viscosity value can be controlled by allowing the present composition to comprise both coarse cellulose fibers and ultrafine cellulose fibers, thereby producing the composition of the present invention. Since the conventional thickener comprising ultrafine cellulose fibers as active ingredients ensures high transparency, or since such a thickener is considered to enhance its thickening properties by slimming fibers to increase surface area and also to increase the contact among fibers, it has been important for the conventional thickener to reduce unminiaturized fibers. However, in the method for producing a composition comprising ultrafine cellulose fibers proposed by the present invention, miniaturization is controlled, and a certain amount of coarse fibers is left, so that the haze value or the viscosity value can be controlled. Whether or not the coarse cellulose fibers and ultrafine cellulose fibers of the present invention are comprised in a certain composition, and the ratio of such coarse cellulose fibers and ultrafine cellulose fibers comprised in the composition, can be confirmed by measuring the average fiber width.

[Amount of Coarse Fibers]

In the present invention, thickening is achieved by using coarse cellulose fibers and ultrafine cellulose. Whether or not the coarse cellulose fibers and ultrafine cellulose fibers of the present invention are comprised in a certain composition, and the ratio of such coarse cellulose fibers and ultrafine cellulose fibers comprised in the composition, can be confirmed by measuring the average fiber width. Alternatively, such things can also be confirmed by the below-mentioned method of measuring the amount of coarse fibers.

Method of Measuring the Amount of Coarse Fibers:

Water is added to an ultrafine fiber-containing composition as a target, so that the fiber solid concentration is adjusted to 0.2% by mass. Subsequently, the obtained solution is centrifuged under conditions of 12000 G×10 min, and the obtained supernatant is then recovered. Thereafter, the solid concentration in the supernatant is measured by a suitable method. Based on the obtained solid concentration of the supernatant, the amount of coarse cellulose fibers is obtained as the ratio of coarse cellulose fibers according to the following formula.

The ratio of coarse cellulose fiber (%)=100−(the solid concentration in a supernatant/0.2% by mass×100)

The amount of coarse cellulose fibers contained in the composition of the present invention is not particularly limited. It is preferably 0.5% or more and less than 85%. The amount of coarse cellulose fibers is more preferably 1.0% or more and less than 85%, and even more preferably 1.5% or more and less than 85%. If amount of coarse cellulose fibers is in such a range, high thickening effects can be exhibited, in comparison to a thickener consisting of only ultrafine fibers.

In the composition of the present invention, apart from coarse fibers whose surface is fibrillated, ultrafine fibers are independently present. Fibers, the surfaces of which have become fluffy and some of which are nanosized, have already been known. However, the composition of the present invention is not the case, and the present composition is characterized in that coarse cellulose fibers having, for example, a fiber width of 1 μm or more, and nano-sized ultrafine cellulose fibers having, for example, a fiber width of several nm, are each independently present therein.

[Haze]

The composition of the present invention can be characterized by its transparency, namely, its haze value. The term "haze" indicates the scale of transparency of a cellulose suspension. The lower the haze value, the higher transparency that can be obtained. In the present invention, the term "haze" indicates a value measured by the following method, unless otherwise specified.

Method of Measuring Haze:

Water is added to an ultrafine fiber-containing composition as a target, so that the fiber solid concentration is adjusted to 0.2% by mass. The prepared solution only comprises coarse fibers, ultrafine fibers, and water. The prepared solution is measured in accordance with the Japanese Industrial Standards (JIS) K7136, using a haze meter, for example, a haze meter (HM-150) manufactured by MURAKAMI COLOR RESEARCH LABORATORY CO. LTD.

The haze value of the composition of the present invention is not particularly limited, and it is preferably 1.0% to 50%. The haze value may be, for example, 1.9% to 40%. The haze value is more preferably 1.0% to 40%, even more preferably 1.0% to 30%, further preferably 2.0% to 30%, still further preferably 2.0% to 20%, and still further preferably 2.0% to 15%. This is because, if the haze value is in such a range, the composition of the present invention exhibits high thickening properties, and also, particularly preferred properties can be exhibited in the processing of subterranean formations.

It is considered that, in the composition of the present invention, the haze value of which is controlled, ultrafine fibers are independently present, apart from coarse fibers, the surfaces of which are fibrillated. Fibers, the surfaces of which have become fluffy and some of which are nanosized, have already been known. However, the composition of the present invention is not the case, and the present composition is characterized in that coarse cellulose fibers having, for example, a fiber width of 1 μm or more, and nano-sized ultrafine cellulose fibers having, for example, a fiber width of several nm, are each independently present therein.

[Viscosity]

The composition of the present invention is also characterized by its viscosity value in a certain concentration. In the present invention, the viscosity of a composition comprising ultrafine fibers is indicated as a value measured by the following method, unless otherwise specified.

Method of Measuring Viscosity:

Water is added to an ultrafine fiber-containing composition as a target, so that the fiber solid concentration is adjusted to 0.4% by mass. The prepared solution is measured at 25° C. using a B-type viscometer (e.g., Analog Viscometer T-LVT, manufactured by BLOOKFIELD) at a rotation number of 3 rpm (3 min).

The viscosity value of the composition of the present invention is not particularly limited, and it is preferably 4700 mPa·s or more. The viscosity is more preferably 7000 mPa·s or more, and even more preferably 12500 mPa·s or more. This is because, if the viscosity is in such a range, a small amount of cellulose fibers exhibits high thickening properties, and also, particularly preferred properties can be exhibited in well processing. In any case, the upper limit of viscosity is not particularly problematic, and it may be, for example, 20000 mPa·s or less.

It is considered that, in the composition of the present invention, the viscosity value of which is controlled, ultrafine fibers are independently present, apart from coarse fibers, the surfaces of which are fibrillated. Fibers, the surfaces of which have become fluffy and some of which are nanosized, have already been known. However, the composition of the present invention is not the case, and the present composition is characterized in that coarse cellulose fibers having, for example, a fiber width of 1 μm or more, and nano-sized ultrafine cellulose fibers having, for example, a fiber width of several nm, are each independently present therein.

[Particularly Preferred Properties]

The fluid obtained by the present invention may have properties that are preferable for well processing, namely, good proppant dispersibility, improved viscosity of mud water, and high water stopping property. Methods of measuring these properties and preferred ranges will be described below.

<Proppant Dispersibility>

Water is added to an ultrafine fiber-containing composition as a target, so that the fiber solid concentration is adjusted to 0.2% by mass. NaCl is added to the obtained solution, so that it is adjusted to become a 10-mass-% NaCl aqueous solution. To 100 mL of the prepared solution, 0.2 g of xanthan gum (XCD-Polymer, manufactured by manufactured by Telnite Co., Ltd.) and 2.0 g of starch (e.g., Telpolymer DX, manufactured by Telnite Co., Ltd.) are added, and the obtained mixture is then stirred for 1 minute to prepare a polymer aqueous solution. To the thus prepared polymer aqueous solution, 6 g of proppants (e.g., Bauxite 20/40, manufactured by SINTEX) are added, and the obtained mixture is then stirred for 1 minute to prepare a proppant/polymer aqueous solution. The prepared proppant/polymer aqueous solution is added into a 100-mL measuring cylinder, and the scale of the measuring cylinder, at which the uppermost portion of the proppant/polymer aqueous solution is positioned (hereinafter referred to as a "scale before still standing"), is read. Thereafter, after the measuring cylinder is left at rest for 1 hour, the scale of the measuring cylinder, at which the uppermost portion of the proppants is positioned (hereinafter referred to as a "scale after still standing"), is read. Setting the scale before still standing at 0 mL, and also setting the scale of the lowermost portion of the measuring cylinder at 100 mL, proppant dispersibility is evaluated.

It can be said that the proppant dispersibility is more excellent, as the scale after still standing is decreased. Using the composition of the present invention, the proppant dispersibility can be set at less than 70 mL. In a preferred aspect, the proppant dispersibility can be set at less than 55 mL, and in a more preferred aspect, it can be set at less than 40 mL.

<Viscosity of Mud Water>

Mud Water Viscosity 1:

Water is added to an ultrafine fiber-containing composition as a target, so that the fiber solid concentration is adjusted to 0.2% by mass. To 1000 mL of this solution, 50 g of bentonite (e.g., KUNIGEL V1, KUNIMINE INDUSTRIES CO., LTD.) is added, and the obtained mixture is then stirred at 3000 rpm for 60 minutes. Thereafter, the reaction mixture is left at rest for 24 hours to produce sufficiently hydrated mud water. The viscosity of the obtained mud water is measured by the aforementioned method.

Mud Water Viscosity 2:

Water is added to an ultrafine fiber-containing composition as a target, so that the fiber solid concentration is adjusted to 0.1% by mass. To 1000 mL of this solution, 50 g of bentonite (e.g., KUNIGEL V1, KUNIMINE INDUSTRIES CO., LTD.) is added. Moreover, 1 g of carboxymethyl cellulose (e.g., those which satisfy that an aqueous suspension of 2-mass-% carboxymethyl cellulose shows a viscosity of 500.0 to 900.0 mPa·s at 25° C.; Tokyo Chemical Industry Co., Ltd.) is added to the mixture, and the thus obtained mixture is stirred at 3000 rpm for 60 minutes and is then left at rest for 24 hours, so as to produce sufficiently hydrated mud water. The viscosity of the obtained mud water is measured by the aforementioned method.

It can be said that the viscosity of mud water is improved, as the viscosity value of the mud water is increased. Using the composition of the present invention, the viscosity can be set at 43000 mPa·s or more in the aforementioned measurement of mud water viscosity 1. In a preferred aspect, the viscosity can be set at 45500 mPa·s, and in a more preferred aspect, it can be set at 47500 mPa·s or more. Using the composition of the present invention, the viscosity can be set at 46500 mPa·s or more in the aforementioned measurement of mud water viscosity 2. In a preferred aspect, the viscosity can be set at 49500 mPa·s or more, and in a more preferred aspect, it can be set at 51000 mPa·s or more.

<Water Stopping Property Test>

Water Stopping Property Test:

Using a filtration testing machine according to American Petroleum Institute (API) standards, a pressure of 3 kg/cm2G is applied to 200 mL of the mud water produced by the aforementioned method of mud water viscosity 2, at 25° C. at room temperature for 30 minutes. Thereafter, the amount of filtered water is measured.

In the water stopping test, it can be said that a higher water stopping property can be obtained, as the amount of filtered water is decreased. Using the composition of the present invention, the amount of water leaked can be set at 9.6 mL or less in the aforementioned water stopping property test. In a preferred aspect, the amount of water leaked can be set at 8.2 mL or less, and in a more preferred aspect, it can be set at 7.8 mL or less.

[Intended Use]

(Intended Use as Composition)

When the composition of the present invention comprising ultrafine cellulose fibers (hereinafter, simply referred to as "the composition of the present invention" at times) is added to a fluid, it can modify the properties of the fluid in various ways. Accordingly, the composition of the present invention can be used for various purposes in which the properties of the present composition can be utilized. The use purpose (intended use) of the composition of the present invention comprising ultrafine cellulose fibers is not particularly limited, as long as it is relevant to the processing of subterranean formations. Examples of the intended use are as follows.

Since the composition of the present invention comprising ultrafine cellulose fibers can exhibit an excellent viscosity in a subterranean formation processing fluid, it can be used as a thickener in the subterranean formation processing fluid.

Since the composition of the present invention comprising ultrafine cellulose fibers can exhibit an excellent water stopping property, it can be used as a lost circulation preventing agent or a dehydration controller.

The composition of the present invention comprising ultrafine cellulose fibers can also exert an emulsification function by capturing oil droplets into the network of the ultrafine fibers in a subterranean formation processing fluid and as such, can be expected to be used as an emulsifier. Specifically, the composition of the present invention can be used for the subterranean formation processing fluid as an emulsion and can be used for stabilizing an emulsion substance contained in the subterranean formation processing fluid.

The composition of the present invention comprising ultrafine cellulose fibers has thixotropy and can therefore exert the excellent ability to form side walls when used in mud water. The composition of the present invention can facilitate the press filling of cement when used in a cementing fluid. Thus, the composition of the present invention can be used as a side wall-forming agent or a cementing adjuster.

The composition of the present invention comprising ultrafine cellulose fibers can be used even in an environment of high temperatures, for example, up to 300° C. The ultrafine cellulose fibers have a decomposition temperature of 300° C. and have neither melting point nor glass transition temperature due to high crystallinity. Unlike general resins, the ultrafine cellulose fibers are therefore free from settling. Therefore, the composition of the present invention can be used even in a very deep water well.

Since the composition of the present invention comprising ultrafine cellulose fibers exhibits excellent acid resistance and its viscosity is not reduced, it can be used in an acidic fluid such as an acid fracturing fluid.

Since the composition of the present invention comprising ultrafine cellulose fibers exhibits excellent alkali resistance and its viscosity is not reduced, it can be used in an alkaline fluid such as a fracturing fluid.

Since the composition of the present invention comprising ultrafine cellulose fibers exhibits excellent salinity tolerance and its viscosity is not reduced, it can be used in inhibited mud water or a fracturing fluid, into which a large amount of salt is added.

The composition of the present invention comprising ultrafine cellulose fibers can be used by being dispersed in a suitable dispersion medium. The dispersion medium is not particularly limited, as long as ultrafine cellulose fibers can be dispersed therein. As such a dispersion medium, water, an organic solvent, oil (e.g., light oil, mineral oil, synthetic oil, edible oil, and inedible oil) or the like can be used.

The composition of the present invention comprising ultrafine cellulose fibers can be processed into various forms such as a solid, slurry, a dried product, or a concentrate (including a gel product), etc. Since the composition of the present invention is dispersed in an aqueous dispersion medium when used, it may be processed such that it can be easily dispersed therein. Upon concentration of the present composition, the concentration method is not particularly limited. Examples of the concentration method include a method of adding a concentrating agent to a solution containing ultrafine fibers, and a method of using a common drying machine. In addition, known methods, such as the methods described in WO2014/024876, WO2012/107642, and WO2013/121086, can also be used.

The ultrafine cellulose fibers contained in the composition of the present invention can be decomposed using a breaker. The decomposition can control the viscosity or prevent residues in a subterranean formation. Various components that can decompose the cellulose fibers can be used as the breaker. Examples thereof include, but are not limited to, oxidizing agents such as ammonium persulfate and sodium persulfate, acids such as hydrochloric acid and sulfuric acid, and enzymes such as cellulase.

The ultrafine cellulose fibers contained in the composition of the present invention can be cross-linked with the aim of improving a viscosity effect or the like. Various components that can cross-link the cellulose fibers can be used as the cross-linking agent. Examples thereof include, but are not limited to, borate, potassium hydroxide, nitrate, zirconium, and titanium.

<Fluid>

The composition of the present invention can be used, as mentioned above, for thickening, lost circulation prevention, dehydration adjustment, emulsification, side wall formation, and cementing adjustment. Also, the composition of the present invention is resistant to temperatures, acids, alkalis, and salts and as such, can be added, for use, to various fluids for use in subterranean formation processing, for example, well drilling. Such a fluid includes, for example, a fracturing fluid, mud water, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, and a gravel packing fluid.

When the composition of the present invention comprising ultrafine cellulose fibers is contained in a fluid for use, the content is not particularly limited as long as the intended effect is exerted. Typically, the fluid can contain 0.005 to 10% by mass, preferably 0.01 to 5% by mass, of the cellulose fibers in terms of the solid concentration (as the total amount of the cellulose fibers).

<Other Components in Fluid>

The fluid provided by the present invention may contain various components that are added to conventional fluids for subterranean formation processing, in addition to the composition of the present invention comprising ultrafine cellulose fibers. Examples of the components to be added can include, but are not limited to, weighting materials, viscosity adjusters, dispersants, coagulants, lost circulation preventing agents, dehydration adjusters, pH adjusters, friction reducers, hygroscopic expansion controlling agents, emulsifiers, surfactants, biocides, antifoaming agents, scale preventives, corrosion inhibitors, temperature stabilizers, resin coating agents, crack support materials, salts, and proppants. Only one of these components may be added, or two or more thereof may be added.

The weighting material is used for enhancing the specific gravity of the fluid, stabilizing bare side walls, and preventing burst of gas, water, or the like. A mineral such as barite or hematite can be used as the weighting material, though the weighting material is not limited thereto.

The viscosity adjuster is also called gelling agent, thickener, or mud conditioning agent and is used for optimizing the viscosity of the fluid. In addition to minerals such as bentonite, attapulgite, sepiolite, and synthetic smectite, water-soluble natural and synthetic polymers are used as components therefor. One preferred example of the water-soluble polymer includes a polymer derived from a natural polysaccharide. Specific examples of the viscosity adjuster include, but are not limited to, natural products or natural product-derived ones such as guar gum and guar gum derivatives, water-soluble cellulose derivatives such as methylcellulose, ethylcellulose, hydroxyethylcellulose, hydroxypropylmethylcellulose, hydroxyethylmethyl cellulose, glyoxal-added hydroxypropylmethylcellulose, carboxymethylcellulose, and carboxyethylcellulose, gum arabic, alginic acid and its esters, alginate, elemi resin, ghatti gum, carrageenan, karaya gum, carob bean gum, thickening polysaccharides, tamarind gum, tragacanth gum, starch glycolate, starch acid salts, furcellaran, glucose, glucose polysaccharides, sucrose, and xanthan gum. Examples of the synthetic polymer include, but are not limited to, partially hydrolyzed polyacrylamide (PHPA polymer), polyvinyl alcohol, and polyacrylate polymers.

The lost circulation preventing agent is used for preventing the runoff of the subterranean formation processing fluid. Sawdust, straw, cellophane, cement, pulp fibers, polylactic acid, polyglycolic acid, polyarylate, or the like can be used as the lost circulation preventing agent, though the lost circulation preventing agent is not limited thereto.

The dehydration adjuster is used for decreasing dehydration and strengthening the protection of side walls. A sulfonated asphalt derivative, a starch derivative, polyarylate, a polyanionic cellulose polymer, or the like is used as the dehydration adjuster, though the dehydration adjuster is not limited thereto.

The emulsifier is used for dispersing, in one liquid, the other liquid that is usually less miscible therewith. Examples of the emulsifier include, but are not limited to, glycerin ester, saponin, sucrose fatty acid ester, lecithin, polyethylene glycol, polyoxyethylene cetyl ether, polyoxyethylene oleyl ether, polyoxyethylene stearyl ether, polyoxyethylene lauryl ether, polyoxyethylene octyl dodecyl ether, polyoxyethylene decyl tetradecyl ether, polyoxyethylene behenyl ether, ethyl caprate, cetyl palmitate, stearyl stearate, cetyl octanoate, hexyldecyl isostearate, octyl isononanoate, dodecyl isononanoate, glycerin stearate, glycerin palmitate, glycerin tri(caprylate-caprate), sorbitan monostearate, sorbitan oleate, propylene glycol stearate, propylene glycol oleate, propylene glycol laurate, glycol stearate, glycol dioleate, polyethylene glycol monostearate, polyoxyethylene glycol isostearate, polyoxyethylene hydrogenated castor oil laurate, polyoxyethylene hydrogenated castor oil, polyoxyethylene sorbitan fatty acid ester, and dimethicone copolyol.

The proppant is solid matter of approximately 0.5 mm and is used for being pushed in, for example, a fracturing crack and supporting the crack so as not to close the crack. Examples of the proppant include, but are not limited to, sand, glass beads, ceramic particles, and resin-coated sand.

(Fracturing Fluid)

A preferred embodiment provides a fracturing fluid for use in hydraulic fracturing, comprising the composition of the present invention comprising ultrafine cellulose fibers. The content of the cellulose fibers in the fracturing fluid is not particularly limited as long as the intended effect is exerted. The fracturing fluid contains, for example, 0.002 to 20% by mass, preferably 0.02 to 2% by mass, more preferably 0.04 to 1% by mass, of the cellulose fibers in terms of the solid concentration (as the total amount of the cellulose fibers).

The fracturing fluid generally contains approximately 90 to 95% by mass of water or an organic solvent as a solvent or a dispersion medium and contains approximately 5 to 9% by mass of a proppant (support). The fracturing fluid optionally further contains approximately 0.5 to 1% by mass of various additives such as a gelling agent, a scale preventive, an acid for dissolving rocks, etc., and a friction reducer. These components and additives can also be contained in the same ranges as above in the fracturing fluid provided by the present embodiment.

The ultrafine cellulose fibers in the fracturing fluid can perform the stable dispersion of the proppant as well as flexible viscosity control by further improvement in viscosity through cross-linking reaction and by reduction in the viscosity of the fluid caused by decomposition after use. Also, the ultrafine cellulose fibers can also be used as a degradable lost circulation preventing agent in the fracturing fluid. The ultrafine cellulose fibers can form better cracks because the internal pressure of well is easily applied by preventing lost circulation. The addition of a conventional lost circulation preventing agent to the fracturing fluid might clog the output passage of gas. By contrast, the lost circulation preventing agent consisting of the ultrafine cellulose fibers does not clog the output passage by decomposition after use.

(Mud Water)

A preferred embodiment provides mud water for use in well drilling, comprising the composition of the present invention comprising ultrafine cellulose fibers. The content of the cellulose fibers in the mud water is not particularly limited as long as the intended effect is exerted. The mud water contains, for example, 0.004 to 40% by mass, preferably 0.04 to 4% by mass, more preferably 0.08 to 2% by mass, of the cellulose fibers in terms of the solid concentration (as the total amount of the cellulose fibers).

The mud water for use in well drilling is generally used for removing cuttings from a bottom hole and transporting the cuttings aboveground. The mud water also has roles in preventing the unintended flow of the fluid into a well or gushing of the fluid to above ground by controlling the internal pressure of the well, preventing the collapse of a subterranean formation by protecting side walls, and cooling an instrument in a well by decreasing the friction between a drill string and side walls. The mud water also has a role in providing information on the underground by transporting cuttings or gas. The mud water includes bentonite mud water, lignosulfonate mud, KCl polymer mud, oil-based mud water, and the like. The present embodiment provides various mud waters.

In general, the bentonite mud water is inexpensive and easily handled, but is vulnerable to salts or cement and is easily gelled. In order to compensate for these disadvantages, carboxymethylcellulose or the like has heretofore been added thereto in some cases. The present invention can provide bentonite mud water having higher performance.

The present embodiment provides disperse mud water comprising the composition of the present invention comprising ultrafine cellulose fibers. Such mud water can contain conventional lignosulfonate (also referred to as ligninsulfonic acid) as a dispersant, lignite (humic acid derivative), a pH adjuster (e.g., sodium hydroxide), and a weighting material. The disperse mud water provided by the present embodiment can be expected to be further enhanced in terms of a mudstone-protecting function, easy control of viscosity or specific gravity, and resistance to temperatures (reportedly, the general operating temperature of lignosulfonate mud is approximately 175° C. and the general operating temperature of lignite mud is approximately 190° C.), salts, cement, etc., as compared with conventional lignosulfonate mud.

The mud water provided by the present embodiment can also be constituted as KCl mud. K ions are known to be very excellent in the effect of suppressing the swelling or dispersion of clay. On the other hand, K ions have too strong power of aggregation and as such, have heretofore been used in combination with xanthan gum or a partially hydrolyzed polyacrylamide (PHPA) polymer, which can exert a thickening property or a protective colloidal property even in a liquid containing a large amount of K ions. In the present embodiment, the composition comprising ultrafine cellulose fibers provided by the present invention can be used together with xanthan gum or PHPA or instead thereof. The KCl mud provided by the present embodiment can be expected to be further enhanced in terms of a mudstone-protecting function, easy control of viscosity or specific gravity, and resistance to salts, cement, etc., as compared with conventional KCl-polymer mud.

The mud water provided by the present embodiment can also be constituted as oil-based mud water. The oil-based mud water contains oil mud having an oil content of 95% or more, and invert emulsion oil mud which is a water-oil-in emulsion prepared using 15 to 35% of water and an emulsifier. The oil-based mud water generally has advantages such as the suppression of hydration or swelling of a mudstone layer, high-temperature stability, lubricity, the prevention of productivity from being damaged by the invasion of water into an oil layer, low likelihood to corrode metals, and little deterioration attributed to putrefaction, as compared with water-based mud. The present embodiment can be expected to provide oil-based mud water that exploits these properties while further improving them.

(Cementing Fluid)

A preferred embodiment provides a cementing fluid comprising the composition of the present invention comprising ultrafine cellulose fibers. The content of the cellulose fibers in the cementing fluid is not particularly limited as long as the intended effect is exerted. The cementing fluid contains, for example, 0.001 to 40% by mass, preferably 0.01 to 20% by mass, more preferably 0.05 to 5% by mass, of the cellulose fibers in terms of the solid concentration (as the total amount of the cellulose fibers).

General cement such as tricalcium silicate or high temperature-resistant cement such as class G cement for use in high-temperature wells can be used in the cementing fluid. A cementing agent such as a cement accelerator or a cement retarder can be used as an additive for the optimization of cementing time. Also, a cement dispersant, a fluidity-improving agent, a low-specific gravity or low-dehydration cement additive, or the like can be used. In addition, for example, a dehydration adjuster, a strength stabilizer, a weighting material, a cement spacer additive for improvement in substitution efficiency or mine washing, a chemical wash additive for side wall washing, a cement slurry antifoaming agent, a scale preventive, a lost circulation preventing agent, calcium aluminate, sodium polyphosphate, a fly ash, a foaming agent, a foam stabilizer, and gas in an amount sufficient for forming foams may be added thereto. The cementing fluid may contain inert particles of crushed rubber, if necessary, for imparting elasticity to its cured matter.

The ultrafine cellulose fibers form a three-dimensional network in water and can stably disperse even ultrafine substances. For example, 10 μm or smaller cement particles exist in the cementing fluid. The ultrafine cellulose fibers can stably disperse even 10 μm or smaller particles. The ultrafine cellulose fibers can also stably disperse hydrophobic particles into water and can also stably disperse, for example, hydrophobized pigment particles or minerals. The ultrafine cellulose fibers are highly hydrophilic and can therefore suppress the water separation of the cementing fluid. The ultrafine cellulose fibers are also highly resistant to salts and are therefore highly compatible with the cementing fluid rich in calcium.

For a high-temperature well, such as a geothermal well, which contains carbon dioxide, a cementing fluid that is not deteriorated in the presence of carbon dioxide containing salt water is desirable. A cement composition for use in geothermal wells or similar wells is preferably lightweight with a density in the range of, for example, approximately 9.5 to approximately 14 pounds/gallon (approximately 1.14 to approximately 1.68 g/cm3). The cementing fluid provided by the present embodiment can also be constituted to have a density in such a range.

[Method for Processing Subterranean Formation and Method for Producing Petroleum Resource]

The present invention also provides a method for processing a subterranean formation using the composition of the present invention or the fluid mentioned above. The subterranean formation (also called stratum) also includes a subterranean formation of the sea bottom.

The subterranean formation processing includes well drilling that is used for various purposes. Examples of the well includes, but are not limited to, an exploratory well or a wildcat, an appraisal well, an exploratory well or an exploration well, a delineation well, a development well, a production well, an injection well, an observation well, and a service well.

Also, the subterranean formation processing includes the following:

Cementing: This is mainly performed for filling cement to the gaps between a casing and side walls after well drilling to fix the casing.

Borehole survey or well logging: This includes mud logging. The mud logging involves observing and analyzing gas or cuttings in circulated drilling mud. As a result, oil and gas layers can be detected early, and lithofacies in drilling can be determined.

Recovery of petroleum resources: This includes water flooding and chemical flooding.

Well stimulation: This is performed for the purpose of, for example, improving the nature of side walls or a reservoir near a well, and improving productivity. This includes acidizing which performs washing using hydrochloric acid or the like, and hydraulic fracturing, hydrofracturing, or fracking which secures a fluid passage by making cracks in a reservoir. For production from a sand sheet, this operation includes, for example, sand control for preventing the flow of sand into a well or damage on tubing or equipment by a fluid containing sand, and plastic consolidation which compresses sandstones by the press filling of a fluid containing a resin to a subterranean formation.

Well completion using water-based mud, oil-based mud water, a chemical fluid, or a brine.

Fracturing using a high-pressure fracturing fluid for forming a passage (crack or fracture) in a tight subterranean formation having a low permeability.

Well workover.

Well abandonment.

The present invention also provides a method for producing a petroleum resource using the composition or the fluid obtained by the present invention. The petroleum resource refers to every mineral hydrocarbon including solid, liquid, and gas, present in the underground. Typical examples of the petroleum resource include petroleum (oil) in a liquid form and natural gas in a gaseous form, which are general categories. The petroleum resource also includes conventional petroleum (oil) and natural gas as well as tight sand gas, shale oil, tight oil, heavy oil, extra heavy oil, shale gas, single-layer gas, bitumen, heavy fuel oil, oil sand, oil shale, and methane hydrate.

In the present invention, a composition can be produced by performing a step of concentrating or drying a cellulose fiber dispersion, and then re-dispersing the obtained concentrate or dried product in an aqueous solvent to obtain a re-dispersion. The concentration method applied upon concentration is not particularly limited. Concentration can be carried out using a concentrating agent and/or a drying machine.

Hereinafter, the present invention will be described based on the following examples. However, these examples are not intended to limit the scope of the present invention.

EXAMPLES

Preparation of Phosphorylated Cellulose 1:

100 g of urea, 55.3 g of sodium dihydrogen phosphate dihydrate, and 41.3 g of disodium hydrogen phosphate were dissolved in 109 g of water to prepare a phosphorylating reagent.

A formed sheet made of dried needle-leaved tree bleached kraft pulp was treated with a cutter mill and a pin mill to prepare flocculent fibers. 100 g (absolute dry mass) of these flocculent fibers were weighed, and using a spray, the phosphorylating reagent was uniformly sprayed to the fibers. Thereafter, the resulting fibers were kneaded by hands to obtain drug-impregnated pulp.

The obtained drug-impregnated pulp was subjected to a heat treatment for 80 hours in a damped air drying machine that had been heated to 140° C., so as to obtain phosphorylated cellulose 1. The amount of phosphoric acid groups in the obtained phosphorylated cellulose 1 was 0.678 mmol/g.

Thereafter, 100 g (pulp mass) of the obtained phosphorylated pulp was weighed, and 10 L of ion exchange water was then poured therein. The fibers were uniformly dispersed by stirring, and the obtained mixture was then subjected to filtration and dehydration to obtain a dehydration sheet. This step was repeatedly carried out twice. Subsequently, the obtained dehydration sheet was diluted with 10 L of ion exchange water. While stirring, a 1 N sodium hydroxide aqueous solution was gradually added to the reaction solution to obtain a pulp slurry with a pH value of 12 to 13. Thereafter, this pulp slurry was dehydrated to obtain a dehydration sheet, and 10 L of ion exchange water was then poured therein. The obtained mixture was uniformly dispersed by stirring, and was then subjected to filtration and dehydration to obtain a dehydration sheet. This step was repeatedly carried out twice. As a result of the measurement of an infrared absorption spectrum by FT-IR, absorption based on phosphoric acid groups was observed at 1230 to 1290 cm$^{-1}$, so that addition of phosphoric acid groups could be confirmed. Therefore, it was found that some hydroxy groups of the obtained phosphoric acid-oxo acid introduced cellulose were substituted with functional groups represented by the following structural formula (1). In the following formula, a, b, m, and n each indicate a natural number (wherein a=b×m). At least one of $\alpha^1$, $\alpha^2$, ..., $\alpha^n$ and $\alpha'$ indicates O$^-$, and the others indicate either R or OR. R each represents any one of a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an aromatic group, and a derivative thereof. β indicates mono- or more-valent cation consisting of an organic or inorganic matter.

[Formula 1]

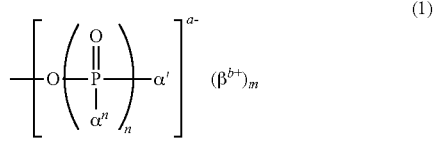

(1)

Preparation of Phosphorylated Cellulose 2:

Phosphorylated cellulose 2 was obtained in the same manner as that of the preparation of phosphorylated cellulose 1, with the exception that the dehydration sheet of phosphorylated pulp obtained in the aforementioned preparation of phosphorylated cellulose 1 was used as a raw material, and further, by repeating a step of introducing phosphoric acid groups once more. The amount of phosphoric acid groups in the obtained phosphorylated cellulose 2 was 1.479 mmol/g.

Preparation of Phosphorylated Cellulose 3:

Phosphorylated cellulose 3 was obtained in the same manner as that of the preparation of phosphorylated cellulose 1, with the exception that the dehydration sheet of phosphorylated pulp obtained in the aforementioned preparation of phosphorylated cellulose 1 was used as a raw material, and further, by repeating a step of introducing phosphoric acid groups twice. The amount of phosphoric acid groups in the obtained phosphorylated cellulose 3 was 1.690 mmol/g.

Preparation of Phosphorylated Cellulose 4:

Phosphorylated cellulose 4 was obtained in the same manner as that of the preparation of phosphorylated cellulose 1, with the exception that the reaction time was changed to 100 minutes in the preparation of phosphorylated cellulose 1. The amount of phosphoric acid groups in the obtained phosphorylated cellulose 4 was 1.298 mmol/g.

Preparation of Carboxylated Cellulose:

Undried needle-leaved tree bleached kraft pulp equivalent to a dry mass of 200 g, 2.5 g of TEMPO, and 25 g of sodium bromide were dispersed in 1500 ml of water. Thereafter, a 13% by mass of sodium hypochlorite aqueous solution was added to the solution, such that the amount of sodium hypochlorite could be 5.0 mmol with respect to 1.0 g of the pulp, so as to start a reaction. During the reaction, a 0.5 M sodium hydroxide aqueous solution was added dropwise to the reaction solution, so that the pH was kept at 10 to 11. At a time point at which no change was observed in the pH value, the reaction was considered to be terminated.

Thereafter, this slurry was dehydrated to obtain a dehydration sheet, and 10 L of ion exchange water was then poured therein. The fibers were uniformly dispersed by stirring, and the obtained mixture was then subjected to filtration and dehydration to obtain a dehydration sheet. This step was repeatedly carried out twice. As a result of the measurement of an infrared absorption spectrum by FT-IR, absorption based on carboxy groups was observed at 1730 $cm^{-1}$, so that addition of carboxy groups could be confirmed.

Production Example 1

Ion exchange water was added to the obtained phosphorylated cellulose 1 to prepare 1.75% by mass of slurry. This slurry was subjected to a defibration treatment for 180 minutes using a defibration treatment device (CLEARMIX-11S, manufactured by M Technique Co., Ltd.) under conditions of 6900 rotations/min, so as to obtain cellulose suspension 1. As a result of X-ray diffraction, it was found that the cellulose maintained cellulose type I crystals.

Production Example 2

Cellulose suspension 1 obtained in Production Example 1 was further passed through a wet-type atomizing device ("ULTIMAIZER" manufactured by Sugino Machine Ltd.) at a pressure of 245 MPa once, so as to obtain cellulose suspension 2. As a result of X-ray diffraction, it was found that the cellulose maintained cellulose type I crystals. A microscopic observation photograph and a transmission electron microscopic photograph are shown. Coarse fibers having a fiber width of 10 μm or more and ultrafine fibers having a fiber width of 1000 nm or less were present (FIG. 1).

Production Example 3

Cellulose suspension 1 obtained in Production Example 1 was further passed through a wet-type atomizing device ("ULTIMAIZER" manufactured by Sugino Machine Ltd.) at a pressure of 245 MPa twice, so as to obtain cellulose suspension 3. As a result of X-ray diffraction, it was found that the cellulose maintained cellulose type I crystals.

Production Example 4

Cellulose suspension 1 obtained in Production Example 1 was further passed through a wet-type atomizing device ("ULTIMAIZER" manufactured by Sugino Machine Ltd.) at a pressure of 245 MPa three times, so as to obtain cellulose suspension 4. As a result of X-ray diffraction, it was found that the cellulose maintained cellulose type I crystals.

Production Example 5

Cellulose suspension 1 obtained in Production Example 1 was further passed through a wet-type atomizing device ("ULTIMAIZER" manufactured by Sugino Machine Ltd.) at a pressure of 245 MPa four times, so as to obtain cellulose suspension 5. As a result of X-ray diffraction, it was found that the cellulose maintained cellulose type I crystals.

Production Example 6

Cellulose suspension 1 obtained in Production Example 1 was further passed through a wet-type atomizing device ("ULTIMAIZER" manufactured by Sugino Machine Ltd.) at a pressure of 245 MPa five times, so as to obtain cellulose suspension 6. As a result of X-ray diffraction, it was found that the cellulose maintained cellulose type I crystals.

Production Example 7

Cellulose suspension 1 obtained in Production Example 1 was further passed through a wet-type atomizing device ("ULTIMAIZER" manufactured by Sugino Machine Ltd.) at a pressure of 245 MPa six times, so as to obtain cellulose suspension 7. As a result of X-ray diffraction, it was found that the cellulose maintained cellulose type I crystals.

Production Example 8

Cellulose suspension 1 obtained in Production Example 1 was further passed through a wet-type atomizing device ("ULTIMAIZER" manufactured by Sugino Machine Ltd.) at a pressure of 245 MPa seven times, so as to obtain cellulose suspension 8. As a result of X-ray diffraction, it was found that the cellulose maintained cellulose type I crystals.

Production Example 9

Cellulose suspension 1 obtained in Production Example 1 was further passed through a wet-type atomizing device ("ULTIMAIZER" manufactured by Sugino Machine Ltd.) at a pressure of 245 MPa eight times, so as to obtain cellulose suspension 9. As a result of X-ray diffraction, it was found that the cellulose maintained cellulose type I crystals.

Production Example 10

Cellulose suspension 1 obtained in Production Example 1 was further passed through a wet-type atomizing device ("ULTIMAIZER" manufactured by Sugino Machine Ltd.) at a pressure of 245 MPa nine times, so as to obtain cellulose suspension 10. As a result of X-ray diffraction, it was found that the cellulose maintained cellulose type I crystals.

Production Example 11

Cellulose suspension 1 obtained in Production Example 1 was further passed through a wet-type atomizing device ("ULTIMAIZER" manufactured by Sugino Machine Ltd.) at a pressure of 245 MPa ten times, so as to obtain cellulose suspension 11. As a result of X-ray diffraction, it was found that the cellulose maintained cellulose type I crystals. A microscopic observation photograph and a transmission electron microscopic photograph are shown. Coarse fibers having a fiber width of 10 μm or more were not observed, and ultrafine fibers having a fiber width of 1000 nm or less were present (FIG. 2).

Production Example 12

Phosphorylated cellulose was diluted with ion exchange water to a concentration of 2% by mass, and was then passed through a single disk refiner, in which the clearance was set at 50 μm, five times. The resultant was further passed through a high-pressure homogenizer ("Panda Plus 2000" manufactured by NiroSoavi) at an operation pressure of 1200 bar once, so as to obtain cellulose suspension 12.

A microscopic observation photograph and a transmission electron microscopic photograph are shown. Coarse fibers having a fiber width of 10 μm or more and ultrafine fibers having a fiber width of 1000 nm or less were present (FIG. 3).

Production Example 13

Phosphorylated cellulose was diluted with ion exchange water to a concentration of 2% by mass, and was then passed through a single disk refiner, in which the clearance was set at 50 μm, five times. The resultant was further passed through a high-pressure homogenizer ("Panda Plus 2000" manufactured by NiroSoavi) at an operation pressure of 1200 bar twice, so as to obtain cellulose suspension 13.

Production Example 14

Phosphorylated cellulose was diluted with ion exchange water to a concentration of 2% by mass, and was then subjected to a defibration treatment for 3 minutes using a defibration treatment device (CLEARMIX-2.2S, manufactured by M Technique Co., Ltd.) under conditions of 21500 rotations/min. Thereafter, the resultant was passed through a high-pressure homogenizer ("Panda Plus 2000" manufactured by NiroSoavi) at an operation pressure of 1200 bar once, so as to obtain cellulose suspension 14.

Production Example 15

Phosphorylated cellulose was diluted with ion exchange water to a concentration of 2% by mass, and was then subjected to a defibration treatment for 3 minutes using a defibration treatment device (CLEARMIX-2.2S, manufactured by M Technique Co., Ltd.) under conditions of 21500 rotations/min. Thereafter, the resultant was passed through a high-pressure homogenizer ("Panda Plus 2000" manufactured by NiroSoavi) at an operation pressure of 1200 bar twice, so as to obtain cellulose suspension 15.

Production Example 16

Water was added to needle-leaved tree bleached kraft pulp (manufactured by Oji F-Tex Co., Ltd., water content: 50% by mass, Canadian standard freeness (CSF) measured in accordance with JIS P8121: 700 ml) to a concentration of 4% by mass. Subsequently, using a double disk refiner, the pulp was beaten to result in a modified CSF of 325 ml (wherein the modified CSF was obtained in accordance with JIS P8121 with the exceptions that a plain-woven 80-mesh fabric was used and the amount of pulp collected was set at 0.3 g) and an average fiber length of 0.66 mm, so as to obtain cellulose suspension 16. A microscopic observation photograph and a transmission electron microscopic photograph are shown. Coarse fibers fiber having a fiber width of 10 μm or more were present, but ultrafine fibers were generated from the surfaces of the coarse fibers, and thus, independent ultrafine fibers were hardly observed (FIG. 4).

Production Example 17

Carboxylated cellulose was diluted with ion exchange water to a concentration of 0.5% by mass, and thereafter, using a defibration treatment device (CLEARMIX-2.2S, manufactured by M Technique Co., Ltd.), the carboxylated cellulose was subjected to a defibration treatment for 30 minutes under conditions of 21500 rotations/min, so as to obtain cellulose suspension 17.

Production Example 18

Carboxylated cellulose was diluted with ion exchange water to a concentration of 0.5% by mass, and thereafter, using a defibration treatment device (CLEARMIX-2.2S, manufactured by M Technique Co., Ltd.), the carboxylated cellulose was subjected to a defibration treatment for 3 minutes under conditions of 21500 rotations/min, so as to obtain cellulose suspension 18.

Production Example 19

Carboxylated cellulose was diluted with ion exchange water to a concentration of 0.5% by mass, and thereafter, using a defibration treatment device (CLEARMIX-2.2S, manufactured by M Technique Co., Ltd.), the carboxylated cellulose was subjected to a defibration treatment for 90 seconds under conditions of 21500 rotations/min, so as to obtain cellulose suspension 19.

Production Example 20

Carboxylated cellulose was diluted with ion exchange water to a concentration of 0.5% by mass, and thereafter, using a defibration treatment device (CLEARMIX-2.2S, manufactured by M Technique Co., Ltd.), the carboxylated cellulose was subjected to a defibration treatment for 45 seconds under conditions of 21500 rotations/min, so as to obtain cellulose suspension 20.

Production Example 21

Carboxylated cellulose was diluted with ion exchange water to a concentration of 0.5% by mass, and thereafter, using a defibration treatment device (CLEARMIX-2.2S, manufactured by M Technique Co., Ltd.), the carboxylated cellulose was subjected to a defibration treatment for 25 seconds under conditions of 21500 rotations/min, so as to obtain cellulose suspension 21.

Production Example 22

Carboxylated cellulose was diluted with ion exchange water to a concentration of 0.5% by mass, and thereafter, using a defibration treatment device (CLEARMIX-2.2S, manufactured by M Technique Co., Ltd.), the carboxylated cellulose was subjected to a defibration treatment for 13 seconds under conditions of 21500 rotations/min, so as to obtain cellulose suspension 22.

Production Example 23

Ion exchange water was added to the obtained phosphorylated cellulose 2 to prepare 2% by mass of slurry. This slurry was passed once through a single disk refiner, in which the clearance was set at 100 μm, to obtain cellulose suspension 23.

Production Example 24

Ion exchange water was added to the obtained phosphorylated cellulose 2 to prepare 2% by mass of slurry. This slurry was passed twice through a single disk refiner, in which the clearance was set at 100 μm, to obtain cellulose suspension 24.

Production Example 25

Ion exchange water was added to the obtained phosphorylated cellulose 2 to prepare 2% by mass of slurry. This slurry was passed three times through a single disk refiner, in which the clearance was set at 100 μm, to obtain cellulose suspension 25.

Production Example 26

Ion exchange water was added to the obtained phosphorylated cellulose 2 to prepare 2% by mass of slurry. This slurry was passed four times through a single disk refiner, in which the clearance was set at 100 μm, to obtain cellulose suspension 26.

Production Example 27

Ion exchange water was added to the obtained phosphorylated cellulose 2 to prepare 2% by mass of slurry. This slurry was passed five times through a single disk refiner, in which the clearance was set at 100 μm, to obtain cellulose suspension 27.

Production Example 28

Ion exchange water was added to the obtained phosphorylated cellulose 2 to prepare 2% by mass of slurry. This slurry was passed six times through a single disk refiner, in which the clearance was set at 100 μm, to obtain cellulose suspension 28.

Production Example 29

Ion exchange water was added to the obtained phosphorylated cellulose 2 to prepare 2% by mass of slurry. This slurry was passed seven times through a single disk refiner, in which the clearance was set at 100 μm, to obtain cellulose suspension 29.

Production Example 30

Ion exchange water was added to the obtained phosphorylated cellulose 2 to prepare 2% by mass of slurry. This slurry was passed eight times through a single disk refiner, in which the clearance was set at 100 μm, to obtain cellulose suspension 30.

Production Example 31

Ion exchange water was added to the obtained phosphorylated cellulose 2 to prepare 2% by mass of slurry. This slurry was passed nine times through a single disk refiner, in which the clearance was set at 100 μm, to obtain cellulose suspension 31.

Production Example 32

Ion exchange water was added to the obtained phosphorylated cellulose 2 to prepare 2% by mass of slurry. This slurry was passed ten times through a single disk refiner, in which the clearance was set at 100 μm, to obtain cellulose suspension 32.

Production Example 33

Ion exchange water was added to the obtained phosphorylated cellulose 1 to prepare 2% by mass of slurry. This slurry was passed once through a single disk refiner, in which the clearance was set at 100 μm, to obtain cellulose suspension 33.

Production Example 34

Ion exchange water was added to the obtained phosphorylated cellulose 1 to prepare 2% by mass of slurry. This slurry was passed five times through a single disk refiner, in which the clearance was set at 100 μm, to obtain cellulose suspension 34.

Production Example 35

Ion exchange water was added to the obtained phosphorylated cellulose 1 to prepare 2% by mass of slurry. This slurry was passed ten times through a single disk refiner, in which the clearance was set at 100 μm, to obtain cellulose suspension 35.

Production Example 36

Ion exchange water was added to the obtained phosphorylated cellulose 1 to prepare 2% by mass of slurry. This slurry was passed 20 times through a single disk refiner, in which the clearance was set at 100 μm, to obtain cellulose suspension 36.

Production Example 37

Ion exchange water was added to the obtained phosphorylated cellulose 1 to prepare 2% by mass of slurry. This slurry was passed 30 times through a single disk refiner, in which the clearance was set at 100 μm, to obtain cellulose suspension 37.

Production Example 38

Ion exchange water was added to the obtained phosphorylated cellulose 2 to prepare 2% by mass of slurry. This slurry was passed once through a wet-type atomizing device ("ULTIMAIZER" manufactured by Sugino Machine Ltd.) at a pressure of 245 MPa to obtain cellulose suspension 38.

Production Example 39

Ion exchange water was added to the obtained phosphorylated cellulose 2 to prepare 2% by mass of slurry. This slurry was passed twice through a wet-type atomizing device ("ULTIMAIZER" manufactured by Sugino Machine Ltd.) at a pressure of 245 MPa to obtain cellulose suspension 39.

Production Example 40

Ion exchange water was added to the obtained phosphorylated cellulose 2 to prepare 2% by mass of slurry. This slurry was passed three times through a wet-type atomizing device ("ULTIMAIZER" manufactured by Sugino Machine Ltd.) at a pressure of 245 MPa to obtain cellulose suspension 40.

Production Example 41

Ion exchange water was added to the obtained phosphorylated cellulose 2 to prepare 2% by mass of slurry. This slurry was passed four times through a wet-type atomizing device ("ULTIMAIZER" manufactured by Sugino Machine Ltd.) at a pressure of 245 MPa to obtain cellulose suspension 41.

Production Example 42

Ion exchange water was added to the obtained phosphorylated cellulose 2 to prepare 2% by mass of slurry. This slurry was passed five times through a wet-type atomizing device ("ULTIMAIZER" manufactured by Sugino Machine Ltd.) at a pressure of 245 MPa to obtain cellulose suspension 42.

Production Example 43

Ion exchange water was added to the obtained phosphorylated cellulose 3 to prepare 2% by mass of slurry. This slurry was passed once through a wet-type atomizing device ("ULTIMAIZER" manufactured by Sugino Machine Ltd.) at a pressure of 245 MPa to obtain cellulose suspension 43.

Production Example 44

Ion exchange water was added to the obtained phosphorylated cellulose 3 to prepare 2% by mass of slurry. This slurry was passed twice through a wet-type atomizing device ("ULTIMAIZER" manufactured by Sugino Machine Ltd.) at a pressure of 245 MPa to obtain cellulose suspension 44.

Production Example 45

Ion exchange water was added to the obtained phosphorylated cellulose 3 to prepare 2% by mass of slurry. This slurry was passed three times through a wet-type atomizing device ("ULTIMAIZER" manufactured by Sugino Machine Ltd.) at a pressure of 245 MPa to obtain cellulose suspension 45.

Production Example 46

Ion exchange water was added to the obtained phosphorylated cellulose 4 to prepare 2% by mass of slurry. This slurry was passed twice through a wet-type atomizing device ("ULTIMAIZER" manufactured by Sugino Machine Ltd.) at a pressure of 245 MPa to obtain cellulose suspension 46.

Production Example 47

Ion exchange water was added to the obtained phosphorylated cellulose 4 to prepare 2% by mass of slurry. This slurry was passed three times through a wet-type atomizing device ("ULTIMAIZER" manufactured by Sugino Machine Ltd.) at a pressure of 245 MPa to obtain cellulose suspension 47.

Test Example 1

Measurement of Haze:
Haze indicates the scale of transparency of a cellulose suspension. The lower the haze value, the higher transparency that can be obtained. The haze value was measured by directly diluting the produced cellulose suspension with ion exchange water to result in a solid concentration of 0.2% by mass, and then by subjecting the cellulose suspension to the measurement of the haze in accordance with JIS K7136, using a haze meter (HM-150) manufactured by MURAKAMI COLOR RESEARCH LABORATORY CO. LTD.

Test Example 2

Measurement of Viscosity:
The obtained samples were each diluted to a concentration of 0.4% by mass, and the viscosity of each sample was then measured at 25° C. at a rotation number of 3 rpm (3 min), using a B-type viscometer (analog viscometer T-LVT, manufactured by BLOOKFIELD).

Test Example 3

Observation Under Transmission Electron Microscope:
A supernatant of a cellulose suspension was diluted with water to a concentration of 0.01% to 0.1% by mass, and the obtained solution was then added dropwise onto a hydrophilized carbon grid film. After drying, it was stained with uranyl acetate, and was then observed under a transmission electron microscope (JEOL-2000EX, manufactured by JEOL).

Test Example 4

Microscopic Observation:
A supernatant of a cellulose suspension was diluted with water to a concentration of 0.01% to 0.1% by mass, and the obtained solution was then added dropwise onto a slide glass. A cover glass was placed thereon, and the resultant was then observed under a digital microscope (KH-7700, manufactured by Hirox).

Test Example 5

Measurement of the Amount of Coarse Fibers:
Ion exchange water was added to defibrated pulp slurry, so as to adjust a slurry solid concentration to 0.2% by mass. Using a refrigerated high-speed centrifuge (H-2000B, KOKUSAN Co., Ltd.), the slurry was centrifuged under conditions of 12000 G×10 min. The obtained supernatant was recovered, and the solid concentration in the supernatant was then measured. The ratio of coarse cellulose was obtained according to the following formula.

Ratio of coarse cellulose (%)=100−(the solid concentration in a supernatant/0.2% by mass×100)

Evaluation Results of Production Examples 1 to 47

The haze value measured by the method of Test Example 1, the viscosity value measured by the method of Test Example 2, and the amount of coarse fibers measured by the method of Test Example 3, are shown in the following tables and FIGS. 5 and 6.

TABLE 1

| Production Example | | Viscosity [mPa · s] | Haze (%) | Coarse fiber amount (%) | Remarks |
|---|---|---|---|---|---|
| Production Ex. 1 | Cellulose suspension 1 | 4920 | 30.4 | 45.3 | |
| Production Ex. 2 | Cellulose suspension 2 | 17840 | 5.5 | 22.1 | FIG. 1 |
| Production Ex. 3 | Cellulose suspension 3 | 16600 | 5.3 | 9.1 | |

TABLE 1-continued

| Production Ex. | | Viscosity [mPa·s] | Haze (%) | Amount of coarse fibers (%) | Remarks |
|---|---|---|---|---|---|
| Production Ex. 4 | Cellulose suspension 4 | 13280 | 2.9 | 11.1 | |
| Production Ex. 5 | Cellulose suspension 5 | 9840 | 2.0 | 5.8 | |
| Production Ex. 6 | Cellulose suspension 6 | 7960 | 1.9 | 1.0 | |
| Production Ex. 7 | Cellulose suspension 7 | 6720 | 1.5 | 0.2 | |
| Production Ex. 8 | Cellulose suspension 8 | 6080 | 1.2 | 0.1 | |
| Production Ex. 9 | Cellulose suspension 9 | 5560 | 1.2 | 0.1 | |
| Production Ex. 10 | Cellulose suspension 10 | 5120 | 1.2 | 0.0 | |
| Production Ex. 11 | Cellulose suspension 11 | 4640 | 1.2 | 0.0 | FIG. 2 |
| Production Ex. 12 | Cellulose suspension 12 | 8480 | 39.3 | 84.5 | FIG. 3 |
| Production Ex. 13 | Cellulose suspension 13 | 10480 | 30.0 | 83.2 | |
| Production Ex. 14 | Cellulose suspension 14 | 10320 | 34.2 | 83.9 | |
| Production Ex. 15 | Cellulose suspension 15 | 12144 | 26.2 | 84.3 | |
| Production Ex. 16 | Cellulose suspension 16 | 412 | 85.2 | 90.7 | FIG. 4 |
| Production Ex. 17 | Cellulose suspension 17 | 1800 | 1.8 | 0.4 | |
| Production Ex. 18 | Cellulose suspension 18 | 17880 | 8.4 | 8 | |
| Production Ex. 19 | Cellulose suspension 19 | 13560 | 13.3 | 2.2 | |
| Production Ex. 20 | Cellulose suspension 20 | 9920 | 21.4 | 9.1 | |
| Production Ex. 21 | Cellulose suspension 21 | 9000 | 34.5 | 10.7 | |
| Production Ex. 22 | Cellulose suspension 22 | 2720 | 56.5 | 73.5 | |
| Production Ex. 23 | Cellulose suspension 23 | 1300 | 44.9 | 90 | |
| Production Ex. 24 | Cellulose suspension 24 | 2640 | 35.5 | 87.2 | |
| Production Ex. 25 | Cellulose suspension 25 | 8000 | 28.7 | 77.7 | |
| Production Ex. 26 | Cellulose suspension 26 | 10400 | 25.5 | 66.4 | |
| Production Ex. 27 | Cellulose suspension 27 | 11600 | 22.3 | 55,1 | |
| Production Ex. 28 | Cellulose suspension 28 | 14800 | 20.4 | 40.5 | |
| Production Ex. 29 | Cellulose suspension 29 | 16000 | 17.6 | 32.1 | |
| Production Ex. 30 | Cellulose suspension 30 | 18000 | 16.1 | 25.4 | |
| Production Ex. 31 | Cellulose suspension 31 | 19000 | 15.2 | 20.1 | |
| Production Ex. 32 | Cellulose suspension 32 | 20000 | 14.3 | 17.8 | |
| Production Ex. 33 | Cellulose suspension 33 | 0 | 77 | 94.1 | |
| Production Ex. 34 | Cellulose suspension 34 | 2280 | 62.1 | 90.8 | |
| Production Ex. 35 | Cellulose suspension 35 | 6560 | 45.6 | 79.8 | |
| Production Ex. 36 | Cellulose suspension 36 | 7800 | 43.6 | 84.8 | |
| Production Ex. 37 | Cellulose suspension 37 | 9400 | 43.5 | 87.7 | |
| Production Ex. 38 | Cellulose suspension 38 | 13200 | 13.9 | 29.1 | |
| Production Ex. 39 | Cellulose suspension 39 | 27000 | 2.5 | 1.8 | |
| Production Ex. 40 | Cellulose suspension 40 | 24600 | 1 | 0 | |
| Production Ex. 41 | Cellulose suspension 41 | 18000 | 0.6 | 0.6 | |
| Production Ex. 42 | Cellulose suspension 42 | 10960 | 0.7 | 0 | |
| Production Ex. 43 | Cellulose suspension 43 | 15600 | 13.4 | 30.2 | |
| Production Ex. 44 | Cellulose suspension 44 | 18000 | 2.1 | 21.3 | |
| Production Ex. 45 | Cellulose suspension 45 | 15600 | 0.9 | 16 | |
| Production Ex. 46 | Cellulose suspension 46 | 20000 | 4.6 | 37.9 | |
| Production Ex. 47 | Cellulose suspension 47 | 10200 | 1.8 | 2.6 | |

Examples 1 to 33 and Reference Examples 1 to 14

Proppant Dispersibility:

The proppant dispersibility of each of the cellulose suspensions produced in Production Example 1 to 47 was evaluated by the following proppant precipitation test. That is to say, NaCl was added to cellulose suspension 1, which had been diluted to a concentration of 0.2% by mass, so as to prepare a 10-mass-% NaCl aqueous solution. To 100 mL of this aqueous solution, 0.2 g of xanthan gum (XCD polymer, manufactured by Telnite Co., Ltd.) and 2.0 g of starch (Telpolymer DX, manufactured by Telnite Co., Ltd.) were added, and the obtained mixture was then stirred for 1 minute to prepare a polymer aqueous solution. Thereafter, 6 g of proppants (bauxite 20/40, manufactured by SINTEX) were added to the prepared polymer aqueous solution, and the obtained mixture was then stirred for 1 minute to prepare a proppant/polymer aqueous solution. The prepared proppant/polymer aqueous solution was placed in a measuring cylinder with a volume of 100 mL, and the scale of the measuring cylinder, at which the uppermost portion of the proppant/polymer aqueous solution was positioned (hereinafter referred to as a "scale before still standing"), was read. Subsequently, the proppant/polymer aqueous solution was left at rest for 1 hour, and then, the scale of the measuring cylinder, at which the uppermost portion of the proppants was positioned (hereinafter referred to as a "scale after still standing"), was read. Setting the scale before still standing at 0 mL, and also setting the scale of the lowermost portion of the measuring cylinder at 100 mL, proppant dispersibility was evaluated. The measurement was carried out three times, and based on the scale of a mean value from the three measurements, the proppant dispersibility was evaluated according to the following criteria.

A (Extremely excellent): the scale after still standing is less than 40 mL

B (Excellent): the scale after still standing is 40 mL or more and less than 55 mL C (Good): the scale after still standing is 55 mL or more and less than 70 mL D (Poor): the scale after still standing is 70 mL or more The results are shown in the following tables.

TABLE 2

| | | Proppant dispersibility |
|---|---|---|
| Example 1 | Cellulose suspension 1 | B |
| Example 2 | Cellulose suspension 2 | A |
| Example 3 | Cellulose suspension 3 | A |
| Example 4 | Cellulose suspension 4 | A |
| Example 5 | Cellulose suspension 5 | A |

TABLE 2-continued

| | | Proppant dispersibility |
|---|---|---|
| Example 6 | Cellulose suspension 6 | B |
| Example 7 | Cellulose suspension 7 | B |
| Example 8 | Cellulose suspension 12 | C |
| Example 9 | Cellulose suspension 13 | C |
| Example 10 | Cellulose suspension 14 | C |
| Example 11 | Cellulose suspension 15 | C |
| Example 12 | Cellulose suspension 18 | A |
| Example 13 | Cellulose suspension 19 | B |
| Example 14 | Cellulose suspension 20 | B |
| Example 15 | Cellulose suspension 21 | B |
| Example 16 | Cellulose suspension 25 | C |
| Example 17 | Cellulose suspension 26 | C |
| Example 18 | Cellulose suspension 27 | C |
| Example 19 | Cellulose suspension 28 | B |
| Example 20 | Cellulose suspension 29 | B |
| Example 21 | Cellulose suspension 30 | B |
| Example 22 | Cellulose suspension 31 | A |
| Example 23 | Cellulose suspension 32 | A |
| Example 24 | Cellulose suspension 35 | C |
| Example 25 | Cellulose suspension 36 | C |
| Example 26 | Cellulose suspension 37 | C |
| Example 27 | Cellulose suspension 38 | A |
| Example 28 | Cellulose suspension 39 | A |
| Example 29 | Cellulose suspension 40 | C |
| Example 30 | Cellulose suspension 43 | A |
| Example 31 | Cellulose suspension 44 | A |
| Example 32 | Cellulose suspension 46 | A |
| Example 33 | Cellulose suspension 47 | B |
| Reference Example 1 | Cellulose suspension 8 | D |
| Reference Example 2 | Cellulose suspension 9 | D |
| Reference Example 3 | Cellulose suspension 10 | D |
| Reference Example 4 | Cellulose suspension 11 | D |
| Reference Example 5 | Cellulose suspension 16 | D |
| Reference Example 6 | Cellulose suspension 17 | D |
| Reference Example 7 | Cellulose suspension 22 | D |
| Reference Example 8 | Cellulose suspension 23 | D |
| Reference Example 9 | Cellulose suspension 24 | D |
| Reference Example 10 | Cellulose suspension 33 | D |
| Reference Example 11 | Cellulose suspension 34 | D |
| Reference Example 12 | Cellulose suspension 41 | D |
| Reference Example 13 | Cellulose suspension 42 | D |
| Reference Example 14 | Cellulose suspension 45 | D |

Examples 34 to 66 and Reference Examples 15 to 28

Mud Water Viscosity 1:

The cellulose suspensions produced in Production Examples 1 to 47 were each diluted to a concentration of 0.2% by mass. Thereafter, 50 g of bentonite (KUNIGEL V1, KUNIMINE INDUSTRIES CO., LTD.) was added to 1000 mL of each diluted solution, and the obtained mixture was then stirred at 3000 rpm for 60 minutes. Thereafter, the reaction mixture was left at rest for 24 hours to produce sufficiently hydrated mud water. The viscosity of the obtained mud water was measured.

Mud Water Viscosity 2:

The cellulose suspensions produced in Production Examples 1 to 47 were each diluted to a concentration of 0.1% by mass. Thereafter, 50 g of bentonite (KUNIGEL V1, KUNIMINE INDUSTRIES CO., LTD.) and 1 g of carboxymethyl cellulose (500.0 to 900.0 mPa·s (2%, water, 25° C.), Tokyo Chemical Industry Co., Ltd.) were added to 1000 mL of each diluted solution, and the obtained mixture was then stirred at 3000 rpm for 60 minutes. Thereafter, the reaction mixture was left at rest for 24 hours to produce sufficiently hydrated mud water. The measurement of the viscosity of the obtained mud water and a water stopping property test were carried out.

Water Stopping Property Test:

Using a filtration test machine at 25° C. in accordance with American Petroleum Institute (API) standards, 200 mL of the obtained mud water was pressurized at a pressure of 3 kg/cm2 G at room temperature for 30 minutes. Thereafter, the amount of filtered water was measured. That is, it can be said that a higher water stopping property can be obtained, as the amount of filtered water is smaller.

The results are shown in the following tables.

TABLE 3

| | | Mud water viscosity 1 (mPa · s) | Mud water viscosity 2 (mPa · s) | Amount of filtered water (ml) |
|---|---|---|---|---|
| Example 34 | Cellulose suspension 1 | 44400 | 47400 | 8.7 |
| Example 35 | Cellulose suspension 2 | 48400 | 51200 | 7.4 |
| Example 36 | Cellulose suspension 3 | 47600 | 54000 | 7.6 |
| Example 37 | Cellulose suspension 4 | 49200 | 52200 | 7.6 |
| Example 38 | Cellulose suspension 5 | 44800 | 48000 | 9.5 |
| Example 39 | Cellulose suspension 6 | 45000 | 47200 | 9.4 |
| Example 40 | Cellulose suspension 7 | 44800 | 47700 | 9.6 |
| Example 41 | Cellulose suspension 12 | 43200 | 48600 | 8.5 |
| Example 42 | Cellulose suspension 13 | 46000 | 49600 | 8.1 |
| Example 43 | Cellulose suspension 14 | 45200 | 46800 | 8.2 |
| Example 44 | Cellulose suspension 15 | 47200 | 50000 | 7.7 |
| Example 45 | Cellulose suspension 18 | 48000 | 51600 | 7.2 |
| Example 46 | Cellulose suspension 19 | 47800 | 53400 | 7.8 |
| Example 47 | Cellulose suspension 20 | 46600 | 50800 | 8.1 |
| Example 48 | Cellulose suspension 21 | 45000 | 49000 | 8.5 |
| Example 49 | Cellulose suspension 25 | 42200 | 46400 | 8.6 |
| Example 50 | Cellulose suspension 26 | 41200 | 44800 | 8.7 |
| Example 51 | Cellulose suspension 27 | 40800 | 43200 | 8.5 |
| Example 52 | Cellulose suspension 28 | 43400 | 45200 | 8.3 |
| Example 53 | Cellulose suspension 29 | 44500 | 48800 | 7.9 |
| Example 54 | Cellulose suspension 30 | 49200 | 48800 | 8.1 |
| Example 55 | Cellulose suspension 31 | 49800 | 50200 | 7.9 |
| Example 56 | Cellulose suspension 32 | 49200 | 49800 | 8.1 |
| Example 57 | Cellulose suspension 35 | 39200 | 43200 | 8.6 |
| Example 58 | Cellulose suspension 36 | 40200 | 41600 | 8.4 |
| Example 59 | Cellulose suspension 37 | 41400 | 44400 | 8.2 |
| Example 60 | Cellulose suspension 38 | 45600 | 47800 | 7.7 |
| Example 61 | Cellulose suspension 39 | 47400 | 49800 | 7.5 |
| Example 62 | Cellulose suspension 40 | 47900 | 50600 | 8.1 |
| Example 63 | Cellulose suspension 43 | 39200 | 42200 | 8.1 |
| Example 64 | Cellulose suspension 44 | 42400 | 46400 | 8.1 |
| Example 65 | Cellulose suspension 46 | 45400 | 49800 | 7.6 |

TABLE 3-continued

|  |  | Mud water viscosity 1 (mPa·s) | Mud water viscosity 2 (mPa·s) | Amount of filtered water (ml) |
|---|---|---|---|---|
| Example 66 | Cellulose suspension 47 | 37200 | 38400 | 8.2 |
| Reference Ex. 15 | Cellulose suspension 8 | 39200 | 45200 | 10.7 |
| Reference Ex. 16 | Cellulose suspension 9 | 38800 | 40400 | 10.8 |
| Reference Ex. 17 | Cellulose suspension 10 | 42000 | 45800 | 10.8 |
| Reference Ex. 18 | Cellulose suspension 11 | 42600 | 46200 | 10.9 |
| Reference Ex. 19 | Cellulose suspension 16 | 992 | 11400 | 14.3 |
| Reference Ex. 20 | Cellulose suspension 17 | 18800 | 27400 | 9.7 |
| Reference Ex. 21 | Cellulose suspension 22 | 12800 | 18200 | 12.2 |
| Reference Ex. 22 | Cellulose suspension 23 | 15400 | 17200 | 11.9 |
| Reference Ex. 23 | Cellulose suspension 24 | 14300 | 16200 | 11.8 |
| Reference Ex. 24 | Cellulose suspension 33 | 12400 | 13400 | 10.9 |
| Reference Ex. 25 | Cellulose suspension 34 | 13200 | 13400 | 10.8 |
| Reference Ex. 26 | Cellulose suspension 41 | 38800 | 41400 | 9.9 |
| Reference Ex. 27 | Cellulose suspension 42 | 37200 | 39800 | 10 |
| Reference Ex. 28 | Cellulose suspension 45 | 37700 | 39400 | 9.9 |

(Summary)

From the above experimental results, it could be confirmed that a cellulose suspension, which was produced by miniaturization or by controlling the amounts of coarse fibers and ultrafine fibers, had high viscosity and thus had good properties suitable as an additive used for excavation. In particular, it could be confirmed that a cellulose suspension having a haze of 1.0% to 50% had good properties suitable as an additive used for excavation. Moreover, a cellulose suspension having a haze of 1.0% to 30% exhibited better properties, and that a cellulose suspension having a haze of 2.0% to 20% exhibited more excellent properties.

As in the case of Reference Examples 1 to 4, 6, 12, 13, and 14, in the case of a dispersion in which ultrafine cellulose fibers accounted for a majority of portion, the dispersion stability of proppants caused by the network of coarse fibers and ultrafine fibers, as seen in Examples 1 to 33, could not be observed.

In a case where the amount of coarse fibers is too large, as in the case of Reference Examples 5 and 7 to 11, miniaturization has not progressed. Thus, the amount of ultrafine fibers necessary for the expression of viscosity has been insufficient, and as a result, viscosity has not been sufficient, either. Moreover, the dispersion stability of proppants has not been sufficient, either.

In Examples 34 to 66, mud water was prepared, and the viscosity and water stopping property thereof were then measured. Mud water comprising coarse fibers in a predetermined ratio exhibited a high viscosity and an excellent water stopping property. Furthermore, in a system in which such mud water was combined with carboxymethyl cellulose, more excellent thickening properties were exhibited.

INDUSTRIAL APPLICABILITY

The composition provided by the present invention can be used, for example, as a thickener, and can be utilized in a wide range of field including pharmaceutical products, cosmetic products, food products, industrial products used in architecture field, and the like. In particular, it can be expected that the composition of the present invention can be used in fluids, which extremely highly require high-viscosity thickeners and are associated with production of petroleum and gas.

The invention claimed is:

1. A subterranean formation processing composition, comprising ultrafine cellulose fibers, which has a haze value of 1.0% to 50%, when the composition is suspended in water such that a solid concentration of cellulose fibers is 0.2% by mass;
   the composition further comprising coarse cellulose fibers;
   wherein the coarse cellulose fibers have a fiber width of 1 μm or more, and the ultrafine cellulose fibers have a fiber width of 100 nm or less; and
   wherein the cellulose fibers are carboxylated or phosphorylated and an amount of substituents is 0.1 mmol/g or more and 3.0 mmol/g or less.

2. The composition according to claim 1, wherein an amount of the coarse cellulose fibers is 0.5% or more and less than 85%.

3. The composition according to claim 1, which is in the form of a dispersion or a solid.

4. The composition according to claim 1, wherein the cellulose fibers are chemically modified.

5. The composition according to claim 4, wherein the cellulose fibers are anionized or cationized.

6. The composition according to claim 1, wherein the cellulose fibers comprise 5% or more of amorphous regions.

7. The composition according to claim 1, which is used by being added to a fracturing fluid, mud water, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, or a gravel packing fluid.

8. A subterranean formation processing fluid comprising the composition according to claim 1, and any one selected from the group consisting of a weighting material, a viscosity adjuster, a dispersant, a coagulant, a lost circulation preventing agent, a pH control agent, a friction reducer, a hydration expansion control agent, an emulsifier, a surfactant, a biocide, an antifoaming agent, a scale inhibitor, a corrosion inhibitor, a temperature stabilizer, a resin coating agent, a crack supporting material, salts, and proppants.

9. A subterranean formation processing fluid comprising the composition according to claim 1, and a water-soluble polymer.

10. A method for producing the composition according to claim 1, which comprises a step of concentrating or drying a cellulose fiber dispersion, and then re-dispersing the obtained concentrate or dried product in an aqueous solvent to obtain a re-dispersion.

11. The production method according to claim 10, wherein the concentration is carried out using a concentrating agent and/or a drying machine.

* * * * *